(12) United States Patent
Yao et al.

(10) Patent No.: US 10,215,025 B2
(45) Date of Patent: Feb. 26, 2019

(54) ROTATION DEVICE AND ROTOR COMPRESSOR AND FLUID MOTOR HAVING THE SAME

(71) Applicant: BEIJING ROSTAR TECHNOLOGY CO. LTD., Beijing (CN)

(72) Inventors: Frank Yao, Beijing (CN); Qihuai Yao, Beijing (CN)

(73) Assignee: Beijing Rostar Technology Co. Ltd., Beijing (CN)

( * ) Notice: Subject to any disclaimer, the term of this patent is extended or adjusted under 35 U.S.C. 154(b) by 256 days.

(21) Appl. No.: 14/762,609

(22) PCT Filed: Jan. 21, 2014

(86) PCT No.: PCT/CN2014/070972
§ 371 (c)(1),
(2) Date: Jul. 22, 2015

(87) PCT Pub. No.: WO2014/114222
PCT Pub. Date: Jul. 31, 2014

(65) Prior Publication Data
US 2015/0322790 A1 Nov. 12, 2015

(30) Foreign Application Priority Data
Jan. 25, 2013 (CN) .......................... 2013 1 0030773

(51) Int. Cl.
*F01C 1/38* (2006.01)
*F01C 1/46* (2006.01)
(Continued)

(52) U.S. Cl.
CPC .................. *F01C 1/38* (2013.01); *F01C 1/46* (2013.01); *F01C 21/0827* (2013.01);
(Continued)

(58) Field of Classification Search
CPC .... F16C 27/066; F16C 35/077; F16C 35/067; F16C 25/06; F16C 25/08; F16C 23/06;
(Continued)

(56) References Cited

U.S. PATENT DOCUMENTS 1,348,434 A * 8/1920 Marshick ............... H05B 7/105
 279/46.4
1,363,451 A * 12/1920 Blackman ................ F04C 2/46
 418/104
(Continued)

FOREIGN PATENT DOCUMENTS

CN 1535349 A 10/2004
CN 101864991 A 10/2010
(Continued)

OTHER PUBLICATIONS

Chinese Office Action dated Sep. 29, 2015, issued in Chinese Application No. 201310030773.X.
(Continued)

*Primary Examiner* — Mark Laurenzi
*Assistant Examiner* — Xiaoting Hu
(74) *Attorney, Agent, or Firm* — Workman Nydegger

(57) ABSTRACT

A rotating device includes a cylinder body, a front end cover, a rear end cover, a main shaft, an eccentric rotor assembly and an isolation mechanism. The eccentric rotor assembly includes an eccentric shaft, a rolling piston wheel and at least one rolling bearing. In the rotating device, the eccentric shaft is isolated from the rolling piston wheel by the rolling bearing and the two are rotated, and the cylinder body is reliably sealed by an elastic pre-tightening force. Further provided are a rotor compressor using the rotating device, and a fluid motor. A rotating valve body and a rotating valve body reset mechanism in the rotating device are also improved.

20 Claims, 11 Drawing Sheets

(51) Int. Cl.

| | | |
|---|---|---|
| *F01C 21/02* | (2006.01) | |
| *F01C 21/08* | (2006.01) | |
| *F04C 2/38* | (2006.01) | |
| *F04C 2/46* | (2006.01) | |
| *F04C 18/38* | (2006.01) | |
| *F04C 18/46* | (2006.01) | |
| *F16C 35/077* | (2006.01) | |
| *F16C 23/08* | (2006.01) | |
| *F16C 27/04* | (2006.01) | |
| *F16C 25/08* | (2006.01) | |
| *F16C 27/06* | (2006.01) | |
| *F01C 11/00* | (2006.01) | |
| *F04C 11/00* | (2006.01) | |
| *F04C 23/00* | (2006.01) | |
| *F01C 19/02* | (2006.01) | |

(52) U.S. Cl.
CPC ...... *F01C 21/0845* (2013.01); *F01C 21/0854* (2013.01); *F01C 21/0863* (2013.01); *F01C 21/0872* (2013.01); *F04C 2/38* (2013.01); *F04C 2/46* (2013.01); *F04C 18/38* (2013.01); *F04C 18/46* (2013.01); *F16C 23/08* (2013.01); *F16C 25/08* (2013.01); *F16C 27/04* (2013.01); *F16C 27/066* (2013.01); *F16C 35/077* (2013.01); *F01C 11/004* (2013.01); *F01C 19/02* (2013.01); *F01C 21/02* (2013.01); *F04C 11/003* (2013.01); *F04C 23/003* (2013.01); *F04C 2240/50* (2013.01); *F04C 2240/52* (2013.01); *F04C 2240/56* (2013.01); *F04C 2240/807* (2013.01)

(58) Field of Classification Search
CPC ........ F16C 23/08; F16C 23/088; F16C 27/04; F04C 18/322; F04C 18/356; F04C 18/3562; F04C 18/46; F04C 18/38; F04C 18/40; F04C 2/356; F04C 2/3562; F04C 2/352; F04C 2/46; F04C 2/40; F04C 2/38; F04C 2/322; F04C 2240/50; F04C 2240/56; F04C 2240/807; F04C 2240/52; F04C 11/003; F04C 23/003; F01C 1/356; F01C 1/3562; F01C 1/46; F01C 1/40; F01C 21/02; F01C 21/0818; F01C 21/0827; F01C 21/0845; F01C 21/0854; F01C 21/0863; F01C 21/0872; F01C 11/004
See application file for complete search history.

(56) References Cited

U.S. PATENT DOCUMENTS

| | | | | | |
|---|---|---|---|---|---|
| 1,379,785 | A * | 5/1921 | Shockley | ................... | F04C 2/46 418/248 |
| 1,491,262 | A * | 4/1924 | Hatton | ................... | F04C 2/46 418/139 |
| 1,660,183 | A * | 2/1928 | Weeden | ................... | F04C 2/46 417/221 |
| 1,698,815 | A * | 1/1929 | Jaworowski | ............ | F04C 18/46 418/248 |
| 1,758,298 | A * | 5/1930 | Teesdale | ................... | F04C 2/46 418/248 |
| 3,304,802 | A * | 2/1967 | Kofink | ................... | F01D 25/164 464/180 |
| 3,837,631 | A * | 9/1974 | Evans | ................... | B23P 13/00 267/1.5 |
| 3,976,340 | A * | 8/1976 | Pitner | ................... | F16C 19/466 384/581 |
| 4,239,318 | A * | 12/1980 | Schwartz | ........... | H01R 13/6583 439/607.18 |
| 4,240,677 | A * | 12/1980 | Payne | ................... | F16C 35/063 384/252 |
| 4,375,247 | A * | 3/1983 | McNeely | ................... | B66F 9/08 187/238 |
| 4,512,623 | A * | 4/1985 | Tomsa | ............... | H01R 13/6583 439/607.17 |
| 4,669,963 | A * | 6/1987 | Ishihara | ................ | F01C 1/3564 418/251 |
| 4,772,139 | A * | 9/1988 | Bretton | ................... | F16C 27/04 384/535 |
| 4,772,185 | A | 9/1988 | Hertell | | |
| 5,062,721 | A * | 11/1991 | Chiba | ..................... | F16C 19/46 384/536 |
| 5,222,884 | A * | 6/1993 | Kapadia | ............... | F04C 18/3562 418/150 |
| 5,344,161 | A * | 9/1994 | Sandgren | ............. | F16C 35/077 267/1.5 |
| 5,533,739 | A * | 7/1996 | Sedy | ..................... | F16J 15/3472 277/390 |
| 5,882,183 | A * | 3/1999 | Andres | ................... | F01C 21/08 418/147 |
| 7,118,181 | B2 * | 10/2006 | Frear | ..................... | E21C 35/197 299/104 |
| 7,223,020 | B2 * | 5/2007 | Bauer | ..................... | F16C 27/04 267/160 |
| 7,618,098 | B2 * | 11/2009 | Frear | ..................... | E21C 35/197 299/102 |
| 2003/0099417 | A1 * | 5/2003 | Bauer | ..................... | F16C 27/04 384/535 |
| 2007/0297919 | A1 * | 12/2007 | Szepesy | ............... | F01C 21/0809 417/220 |
| 2008/0044305 | A1 * | 2/2008 | Hirayama | ............ | F04C 18/356 418/59 |
| 2012/0131949 | A1 * | 5/2012 | Wada | ..................... | F01C 1/356 62/515 |

FOREIGN PATENT DOCUMENTS

| | | |
|---|---|---|
| CN | 101490421 B | 3/2011 |
| CN | 102338026 A | 2/2012 |
| CN | 103061822 A | 4/2013 |
| DE | 3636943 A1 | 6/1987 |
| EP | 1 850 009 A1 | 10/2007 |
| EP | 2 495 396 A1 | 9/2012 |
| JP | S47-17006 | 9/1972 |
| JP | S50-20314 | 3/1975 |
| JP | S 51-57353 | 5/1976 |
| JP | S52-55008 | 5/1977 |
| JP | S5255008 A * | 5/1977 |
| JP | S60-127497 | 8/1985 |
| JP | H7-317679 A | 12/1995 |
| JP | H8-219034 | 8/1996 |
| JP | H11-252851 A | 9/1999 |
| JP | 2000-120669 A | 4/2000 |
| JP | 2003-202018 A | 7/2003 |
| JP | 2005-127306 | 5/2005 |
| JP | 2008-067552 A | 3/2008 |
| JP | 2011-174439 | 9/2011 |
| KR | 10-0819948 | 3/2008 |

OTHER PUBLICATIONS

Japanese Office Action dated May 31, 2016, issued in Japanese Application No. 2015-554035.
International Search Report and Written Opinion dated May 9, 2014, issued in PCT Application No. PCT/CN2014/070972, filed Jan. 21, 2014.
International Search Report dated May 9, 2014, issued in PCT Application No. PCT/CN2014/070972, filed Jan. 21, 2014 with English translation.
European Office Action dated Feb. 2, 2016, issued in European Application No. 14743623.2.

(56) References Cited

OTHER PUBLICATIONS

Japanese Office Action dated Jan. 20, 2017, issued in Japanese Application No. 2015-554035.

* cited by examiner

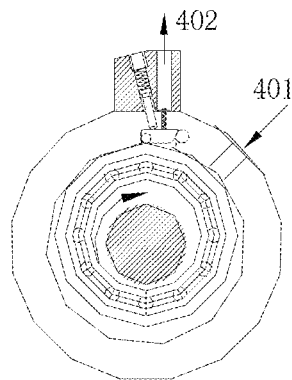
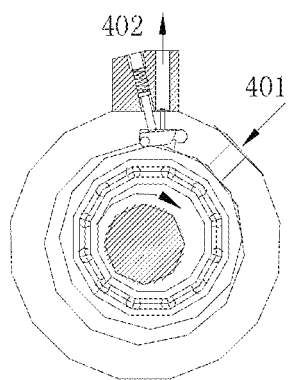
Fig. 12A  Fig. 12B
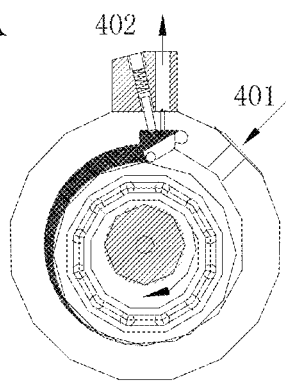
Fig. 12C
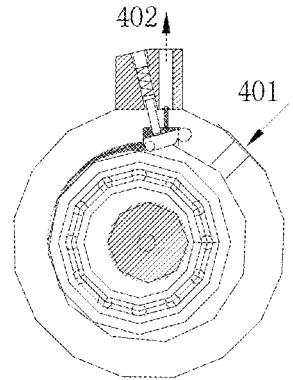
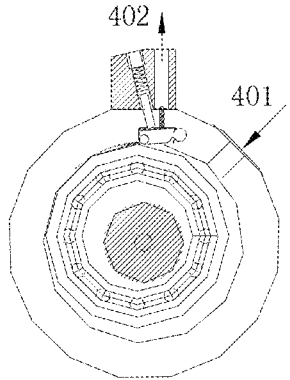
Fig. 12D  Fig. 12E

ROTATION DEVICE AND ROTOR COMPRESSOR AND FLUID MOTOR HAVING THE SAME

BACKGROUND OF THE INVENTION

1. Field of the Invention

The present invention relates to the field of fluid machinery, and in particular to a rotation device, and a rotor compressor and a fluid motor having the same.

2. Description of the Related Art

At present, commercially available displacement compressors used most widely are mainly divided into four types: reciprocating piston compressors, screw compressors, scroll compressors and rotor compressors. For a rotor compressor, when a main shaft is rotating, an eccentric rotor revolves in close contact with an inner wall of a cylinder so as to change a crescent volume space periodically, thereby accomplishing a suction process, a compression process, and an exhaust process. Since the compression process of the rotor compressor is smooth and balanced, the rotor compressors have been applied widely to household refrigeration apparatuses such as air conditioners and refrigerators.

FIG. 1 is a schematic structural view of a prior art rotor compressor. The rotor compressor is disclosed in reference document 2 (Chinese patent application No. 200780027498.9). Referring to FIG. 1, the rotor compressor comprises a cylinder block 1, a rolling rotor 2, an eccentric sleeve 3, a driving shaft 4 with an eccentric shaft portion, a swing stop, and a helical spring. The eccentric sleeve 3 is disposed between the eccentric shaft portion of the driving shaft 4 and the rolling rotor 2 to be rotatable nimbly between them, thereby enabling an eccentric distance of the rolling rotor 2 to be adjusted and achieving a flexible rolling contact seal in operation. The eccentric sleeve 3 rotates on its eccentric center while revolving around the driving shaft. A rotating portion of the swing stop achieves a swing type separation with a swinging portion being tightly pressed against an outer circumferential surface of the rolling rotor 2 under the action of a spring force from the helical spring.

However, when the rotor compressor shown in FIG. 1 operates in a high-intensity working condition, and especially when a frequency of rotation is very high, energy loss caused by sliding frictions between sliding surfaces of the driving shaft 4 with the eccentric shaft portion and of the rolling rotor 2 and the eccentric sleeve 3 are relatively large and thus these sliding surfaces need to be lubricated with oil. After the lubricating oil entering a cylinder and the compression medium are mixed and discharged, the mixed lubricating oil and compression medium need to be separated again. In addition, since sealing is performed by the lubricating oil in a movement clearance, it is necessary to form a high pressure inside a housing of a system in order to separate the lubricating oil from discharged gas. Since an electric motor for driving rotation of the rotor compressor is mounted within the housing, a high-temperature high-pressure environment formed within the housing goes badly against insulation and heat dissipation of the drive electric motor and thus the electric motor will be easily overheated. The rotor compressor is particular compact in size due to structure of the eccentric rotor, and as described above, it has become a custom to use lubricating oil for reasons such as filling, with oil, a clearance in a position where the cylinder block and a seal sleeve come into contact with each other. This limits application of the rotor compressor to large-scale air compressors and air compressors used at a low temperature.

In the rotor compressor shown in FIG. 1, the helical spring urges an end of the swing stop so that the other end of the swing stop is pressed against the rolling rotor 2. Since the helical spring operates in a high-intensity working condition for a long time, it will very easily fault to be broken, thereby affecting a service life of the entire rotor compressor. Therefore, it is necessary to hunt for a more excellent and more reliable resetting and biasing mechanism for the swing stop. Furthermore, due to presence of a lever effect, a force between the swing stop and the rolling rotor 2 cannot be easily controlled. If the force is too large, not only wear of the swing stop is increased, but a power of the compressor is also consumed; while if the force is too small, sealing of the cylinder cannot be ensured.

In addition, a large pressure is endured by a contact portion of a head of the swing stop and a contact portion of an outer cylindrical surface of the rolling rotor 2, and a high-speed relatively sliding movement occurs between the contact portion of the head of the swing stop and the contact portion of the outer cylindrical surface of the rolling rotor 2. Therefore, there should be a sealing structure of low-friction, wear-resistant, high-efficiency, long-life time. If there is no corresponding measure, the contact portions will be very easily damaged. However, a measure in the prior art is to connect the contact portion of the head of the swing stop and the contact portion of the outer cylindrical surface of the rolling seal sleeve 2 together so that the head of the swing stop is fixed with a position of the outer cylindrical surface of the rolling seal sleeve. Although wear and seal problems of the contact portions can be solved in this way, it is impossible to achieve rolling between the outer cylindrical surface of the rolling seal sleeve 2 and a cylindrical inner wall of the cylinder block 1, thereby resulting in frictional wear and occurrence of clearance issues. Although the clearance in the portion where the cylinder block and the seal sleeve come into contact with each other can be filled with oil, this will bring about a problem of separating the compression medium from the lubricating oil.

SUMMARY OF THE INVENTION a. Technical Problem to be Solved

In order to solve one or more of the above problems, the present invention provides a rotation device, and a rotor compressor and a fluid motor having the same.

b. Technical Solution

In accordance with an aspect of the present invention, there is provided a rotation device. The rotation device comprises: a cylinder block; a front end cover and a rear end cover which are tightly connected to a front end and a rear end of the cylinder block, respectively, and which define a cylindrical inner chamber together with the cylinder block; a main shaft which is rotatably supported by the cylinder block and/or the front and rear end covers, is partly located in the cylindrical inner chamber, and has a central axis coinciding with a central axis of the cylinder block; an eccentric rotor assembly which is fitted over a portion of the main shaft located in the cylindrical inner chamber, and comprises: an eccentric shaft which is fitted over the portion of the main shaft located in the cylindrical inner chamber and has a central axis offset from the central axis of the main shaft by a preset position; a rolling piston wheel which is fitted over the eccentric shaft and has a central axis coinciding with the central axis of the eccentric shaft; at least one rolling bearing which is symmetrically fitted over the eccentric shaft, and has an inner ring fixed to the eccentric shaft and an outer ring fixed to the rolling piston wheel to isolate rotation of the eccentric shaft from rotation of the rolling piston wheel, wherein the rolling piston wheel is pressed against an inner cylindrical surface of the cylindrical inner chamber by a preloading elastic force between the at least one rolling bearing and the rolling piston wheel, such that the inner cylindrical surface of the cylindrical inner chamber and an outer cylindrical surface of the rolling piston wheel form a sealed chamber extending in an axial direction; and a partition mechanism partitioning the sealed chamber into a first chamber and a second chamber, the first chamber and the second chamber being independent of each other and being in communication with a first set of through hole and a second set of through hole disposed in the cylinder block, respectively.

In accordance with another aspect of the present invention, there is also provided a rotor compressor. The rotor compressor comprises the above-mentioned rotation device, wherein the first chamber is in communication with a low-pressure compression medium input opening through the first set of through hole, the second chamber is in communication with a discharge opening for a high-pressure compression medium that has been compressed, through the second set of through hole; and a torque on an outside of the cylindrical inner chamber is transmitted to an inside of the cylindrical inner chamber by the main shaft, so that the compression medium is compressed by means of the eccentric rotor assembly.

In accordance with a further another aspect of the present invention, there is provided a fluid motor. The fluid motor comprises the above-mentioned rotation device, wherein the second chamber is in communication with a high-pressure fluid inlet through the second set of through hole; the first chamber is in communication with a low-pressure fluid outlet through the first set of through hole; high-pressure fluid drives the eccentric rotor to rotate, so that a generated torque is transmitted to an outside of the cylindrical inner chamber by means of the main shaft.

c. Advantageous Technical Effects

It can be seen from the above technical solutions that the rotation device and the rotor compressor and the fluid motor having the same according to the present invention have the following advantageous technical effects.

(1) The rolling bearing is used between the eccentric shaft and the rolling piston wheel. With the rolling bearing, an oil-free or minimal-oil (i.e., small-range local oil lubrication) rotor compressor is achieved, thereby overcoming the defects resulted from using of a great deal of lubricating oil. As a result, the rotation device can be applied to fields of large compressors and air compressors.

(2) A radial clearance is employed between an outer cylindrical surface of the outer ring of the rolling bearing and a rolling bearing mounting and positioning inner cylindrical surface, and an elastic preloading element is clamped between them. With the elastic preloading element, not only excessively rigorous accuracy requirements for radial fit dimensions of parts constituting the eccentric rotor can be avoid and the cost is reduced, but also a function of absorbing vibration and noise is achieved, while good reliable sealing of the rotor of the compressor is achieved.

(3) A weight counterbalancing solution is adopted to alleviate problem of momentum unbalance of the rotation device caused by eccentric rotation. The rotor compressor subjected to rotor momentum balanced design further conforms to principles of precision machine technology. In operation, the rotor compressor is low in vibration and noise.

(4) A resetting urging force of a compression spring is directly transmitted to a side position of a rotary valve body close to a rotary valve body head through a resetting pin. Therefore, a contact pressure of the rotary valve body head pressed against an outer cylindrical surface of a planetary piston roller can be accurately adjusted, achieving reliable sealing with a minimum sliding frictional force and improving an operational reliability of the rotation device.

(5) The rotary valve body resetting pin is made in a structure of a conventional pressure cylinder, or a stronger, stabler, more accurate and longer-life time pneumatic element is used to control swing of the rotary valve body, thereby ensuring operational reliability and convenience of maintenance of the entire rotation device.

(6) A roller or a swing seal slider is provided at a distal end of the rotary valve body. Thereby, a frictional force between the rotary valve body and the rolling piston wheel is further decreased and a working efficiency is improved.

BRIEF DESCRIPTION OF THE DRAWINGS

FIGS. 12A-12E are schematic views showing a working flow of the rotor compressor according to the embodiment of the present invention.

DETAILED DESCRIPTION OF THE EMBODIMENTS

Figure 1:
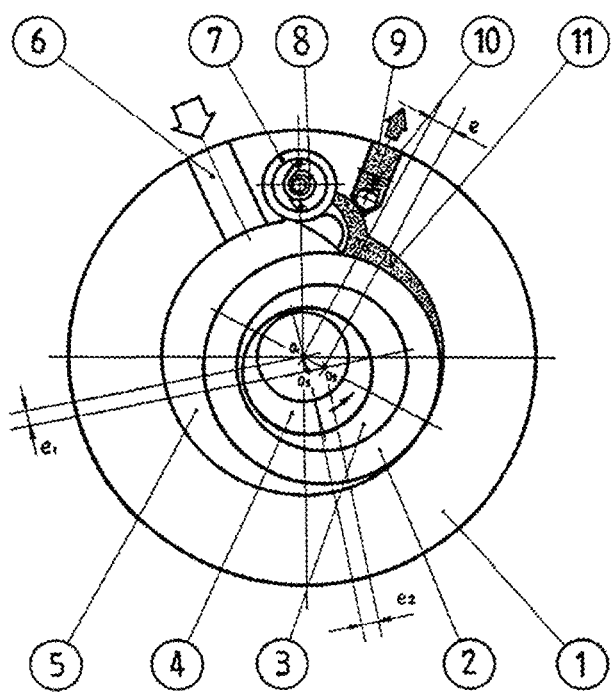
FIG. 1 is a schematic structural view of a prior art rotor compressor.

The objects, technical solutions and advantages of the present invention will be apparent and more readily appreciated from the following description of embodiments taken in conjunction with the accompanying drawings. It is noted that the same or similar elements are indicated by the same reference symbols in the description and the drawings. Implementing forms that are not described and shown in the drawings are those known by those skilled in the art.

In order to facilitate understanding, main elements involved in embodiments of the present invention are first numbered as follow.

List of Symbols of Main Elements of the Present Invention

110—cylinder block; 111—cylinder block body;
112—front cylinder cover; 113—rear cylinder cover;
120—front end cover; 121—front end cover seal rubber ring;
130—rear end cover; 131—rear end cover seal rubber ring;
140—cylinder head;
200—main shaft; 210—main shaft bearing;
211—bearing locking nut; 212—main shaft seal rubber ring;
300—eccentric rotor assembly;
310—eccentric shaft; 320—rolling bearing;
330—rolling piston wheel; 340—counterbalance;
311—eccentric shaft shoulder; 321—side gasket;
322—gasket elastic rubber ring; 325—bearing snap ring;
331 and 341—bearing pressing washer; 342—weight counterbalancing notch;
351—elastic rubber O-ring; 352—rectangular-section elastic rubber ring;
353—spring plate sleeve;
400—partition mechanism; 401—suction through hole;
402—discharge through hole; 403—opening/closing valve;
404—high-pressure compression medium discharge opening; 410 and 410'—rotary valve body;
411—swing seal slider; 411a—compression gas and liquid passage;
411b—hydrostatic bearing pressure chamber; 421—resetting pin;
422—resetting pin spring; 423—nitrogen gas spring;
424—high-pressure gas passage; 425—compression spring;
430—compressor suction chamber; 440—compressor compression chamber;
510—high-pressure fluid inlet; 520—low-pressure fluid outlet;
530—fluid motor work applying chamber; and, 540—fluid motor discharge chamber.

The present invention provides a rotation device and a rotor compressor and a fluid motor having the same. In the rotation device, a rolling bearing is provided between the eccentric shaft and the rolling piston wheel, and reliable sealing of a cylinder block is achieved by an elastic preloading element; and vibration and noise of a rotor compressor is overcome by means of weight counterbalancing. As a result, use of lubricating oil is avoided, and large compressors are achieved. In addition, a brand-new resetting manner for a rotary valve body is also provided and the rotary valve body is improved, thereby ensuring overall operational reliability of the rotation device and the rotor compressor and the fluid motor having the same.

Firstly, the present invention provides a rotation device comprising a cylinder block, a front end cover, a rear end cover, a main shaft, an eccentric rotor assembly, and a partition mechanism. A cylindrical inner chamber is defined by the cylinder block and the front end cover and the rear end cover located on both a front side and a rear side of the cylinder block, respectively. The main shaft is supported by the cylinder block or the front and rear end covers, is partly located in the cylindrical inner chamber, and has a central axis coinciding with a central axis of the cylinder block. The eccentric rotor assembly is fitted over a portion of the main shaft located in the cylindrical inner chamber, and comprises: an eccentric shaft which is fitted over the portion of the main shaft located in the cylindrical inner chamber and has a central axis parallel to the central axis of the main shaft and offset from the central axis of the main shaft by a preset distance; a rolling piston wheel which is fitted over the eccentric shaft and has a central axis coinciding with the central axis of the eccentric shaft; at least one rolling bearing which is symmetrically fitted over the eccentric shaft, and has an inner ring fixed to the eccentric shaft and an outer ring fixed to the rolling piston wheel to isolate rotation of the eccentric shaft from rotation of the rolling piston wheel, wherein the rolling piston wheel is pressed against an inner cylindrical surface of the cylindrical inner chamber by a preloading elastic force between the at least one rolling bearing and the rolling piston wheel, such that the inner cylindrical surface of the cylindrical inner chamber and an outer cylindrical surface of the rolling piston wheel form a sealed chamber extending in an axial direction. The partition mechanism partitions the sealed chamber into a first chamber and a second chamber, and the first chamber and the second chamber are independent of each other and are in communication with a first set of through hole and a second set of through hole disposed in the cylinder block, respectively.

The rotation device may be applied to fluid machinery such as a compressor and a fluid motor. When the rotation device is applied to the compressor and the fluid motor, the suction through hole and the discharge opening are disposed in the following manners.

(1) When the rotation device is applied to the compressor, the first chamber is in communication with a low-pressure compression medium input opening through the first set of through hole, the second chamber is in communication with a discharge opening for a high-pressure compression medium that has been compressed, through the second set of through hole; and a torque on an outside of the cylindrical inner chamber is transmitted to an inside of the cylindrical inner chamber by the main shaft, so that the compression medium is compressed by means of the eccentric rotor assembly; and (2) when the rotation device is applied to the fluid motor, the second chamber is in communication with a high-pressure fluid inlet through the second set of through hole; the first chamber is in communication with a low-pressure fluid outlet through the first set of through hole; and high-pressure fluid drives the eccentric rotor to rotate, so that a generated torque is transmitted to an outside of the cylindrical inner chamber by means of the main shaft.

In the rotation device, each set of through hole may comprise one through hole or a plurality of through holes. In addition, the rolling bearing may be a roller bearing, a ball bearing, a needle roller bearing, an aerodynamic rolling bearing or a composition bearing. The rolling bearing comprises one rolling bearing, but preferably the rolling bearing comprises one set of rolling bearings, two sets of rolling bearings, three sets of rolling bearings, or four sets of rolling bearings, and each set of rolling bearings comprise two rolling bearings disposed left-right symmetrically along the cylindrical inner chamber. "The two rolling bearings are disposed left-right symmetrically" means that the two rolling bearings are disposed symmetrically with respect to a plane that passes through a center point of the portion of the main shaft located in the cylindrical inner chamber and that is perpendicular to the central axis of the main shaft.

The rotor compressor and the fluid motor to which the rotation device is applied, and especially the rotor compressor, will now be described in detail. Those skilled in the art would more clearly understand the rotation device according to the present invention by means of the following description.

Figure 2A:
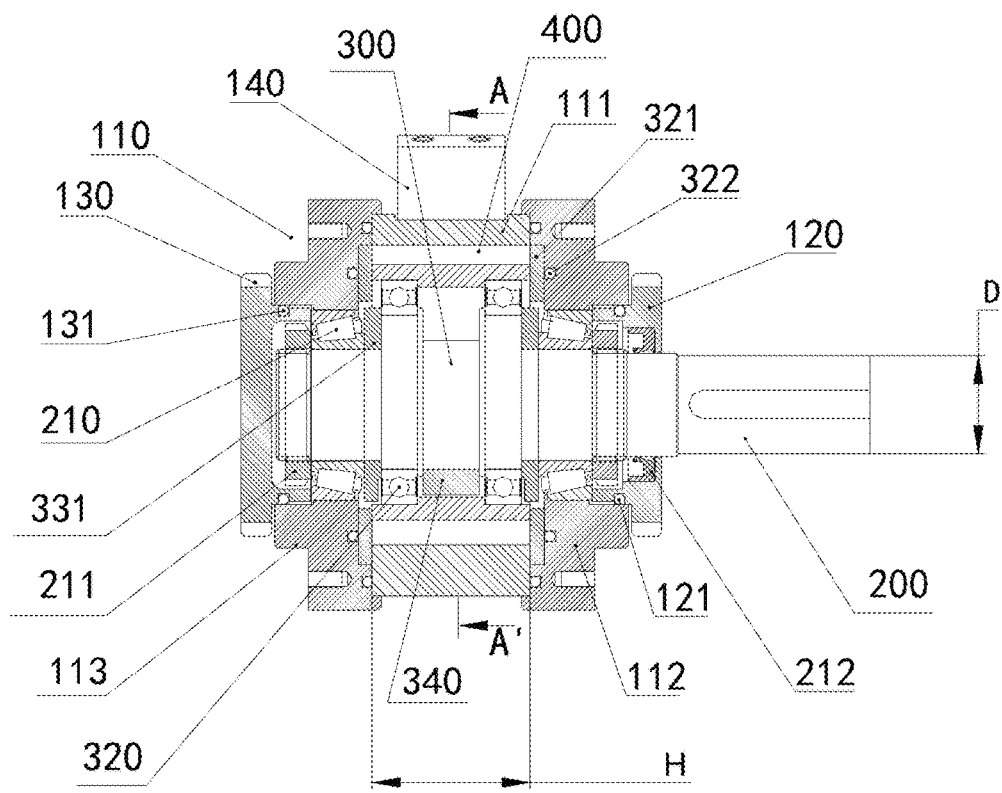
FIG. 2A is a schematic longitudinal section view of a rotor compressor according to an embodiment of the present invention.
Figure 2B:
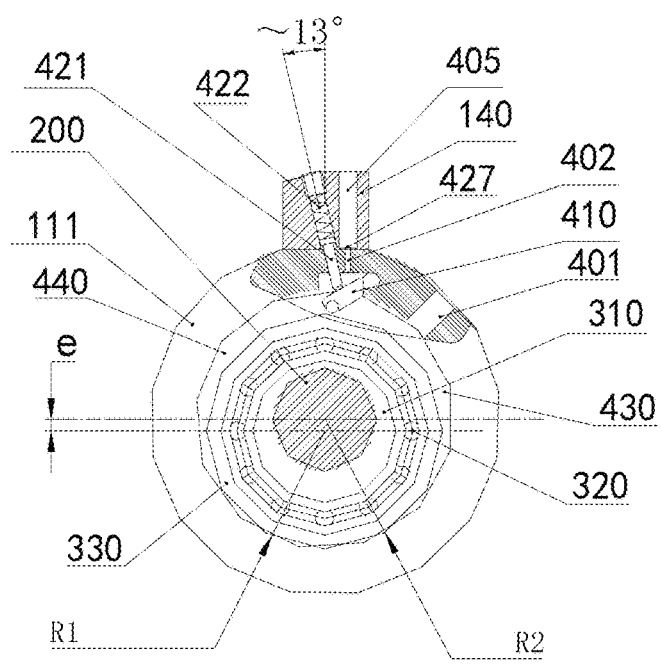
FIG. 2B is a section view of the rotor compressor shown in FIG. 2A which is taken along plane A-A in FIG. 2A.

The present invention also provides a rotor compressor. FIG. 2A is a schematic longitudinal section view of a rotor compressor according to an embodiment of the present invention. FIG. 2B is a section view of the rotor compressor shown in FIG. 2A which is taken along plane A-A in FIG. 2A. Referring to FIGS. 2A and 2B, the rotor compressor according to the embodiment comprises a cylinder block 110, a front end cover 120, a rear end cover 130, a main shaft 200, an eccentric rotor assembly 300, and a partition mechanism 400. The components will now be described in detail, respectively.

Referring to FIG. 2A, the cylinder block 110, together with the front end cover 120 and the rear end cover 130 located on both a front side and a rear side of the cylinder block, respectively, defines a cylindrical inner chamber. The cylindrical inner chamber is a cylinder of the compressor and the cylinder has a radius R2 and a height H. The cylinder block 110 comprises a cylinder block body 111 and a front cylinder cover 112 and a rear cylinder cover 113 disposed on a front end surface and a rear end surface of the cylinder block body 111, respectively. Outside the cylinder block body 111, a cylinder head 140 is disposed in a preset position, and generally the cylinder head 140 is disposed on an upper side. Both a rotary valve body and its resetting mechanism of the partition mechanism, which will be described later, are disposed in correspondence with the position of the cylinder head 140. These contents will be described in detail later.

The main shaft 200 is supported by the front cylinder cover and the rear cylinder cover (112 and 113) of the cylinder block, has a central axis coinciding with the central axis of the cylindrical inner chamber, and has a diameter D. The main shaft 200 comprises a first portion located outside the cylindrical inner chamber, coupled to an external power source and configured to transmit a torque inputted from the external power source to the cylindrical inner chamber; and a second portion located inside the cylindrical inner chamber and configured to drive the eccentric rotor assembly 300 to rotate, by means of the torque inputted from the external power source.

In order to reduce friction, main shaft bearings 210 are disposed between the main shaft 200 and the front and rear cylinder covers (112 and 113), respectively. Preferably, a high-bearing capacity, long-lifetime, high-accuracy tapered roller bearing is used for the main shaft bearings 210 to ensure that a clearance between a side surface of the rotor and a surface of the cylinder cover is accurate and controllable. Positions of the main shaft bearings 210 are located by bearing locking nuts 211. In addition, in order to achieve sealing between the main shaft and the front end cover, a main shaft seal rubber ring 212 is disposed between them. In order to achieve sealing between the front end cover and the front cylinder cover, a front end cover seal rubber ring 121 is disposed between them; and, in order to achieve sealing between the rear end cover and the rear cylinder cover, a rear end cover seal rubber ring 131 is disposed between them.

It should be noted that, although the main shaft 200 is rotatably supported by the front cylinder cover 112 and the rear cylinder cover 113 in the embodiment, it may also be rotatably supported by the front and rear end covers. In addition, although only one end of the main shaft projects from the cylindrical inner chamber in the embodiment, the present invention also comprises a case in which both ends of the main shaft project from the cylindrical inner chamber and torques are inputted from both left and right sides simultaneously. Those skilled in the art could clearly know how to achieve the above technical solution, and thus it is no longer described for the sake of brevity.

Figure 3:
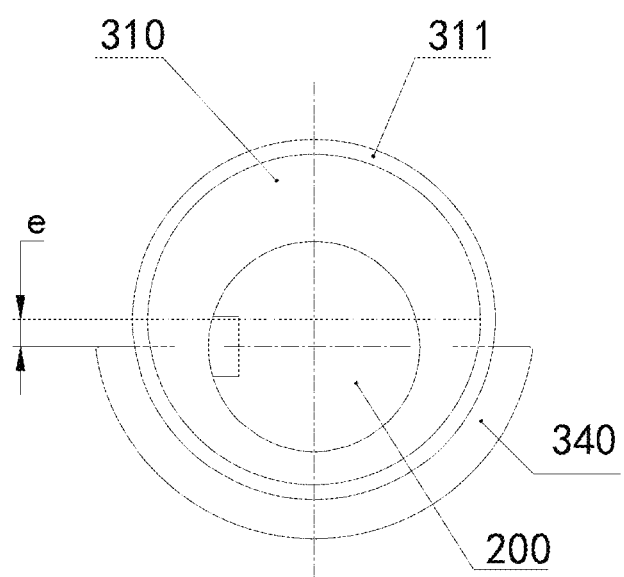
FIG. 3 is a right view of a part of an eccentric rotor assembly in the rotor compressor shown in FIG. 2A.
Figure 4:
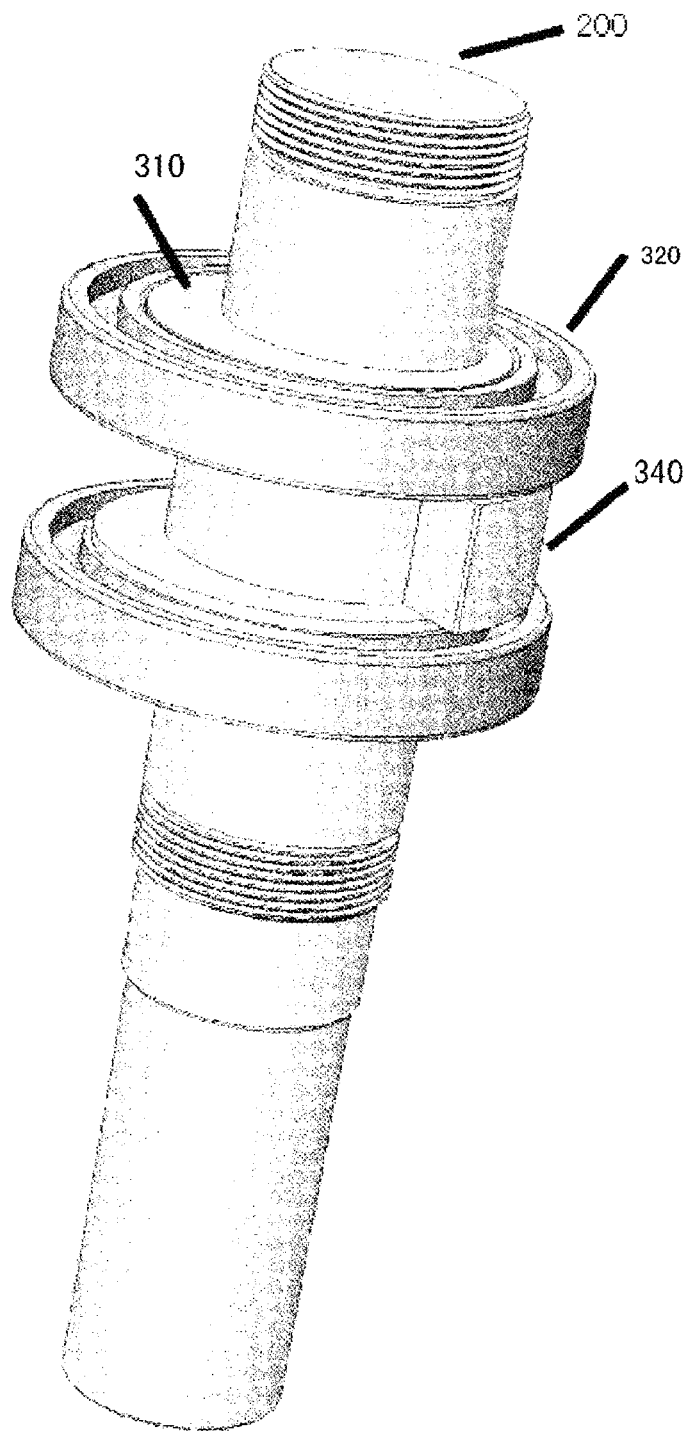
FIG. 4 is a perspective view of a part of the eccentric rotor assembly in the rotor compressor shown in FIG. 2A.

The eccentric rotor assembly 300 is located in the cylindrical inner chamber. FIG. 3 is a local right view of the eccentric rotor assembly 300 in the rotor compressor shown in FIG. 2A. FIG. 4 is a local perspective view of the eccentric rotor assembly in the rotor compressor shown in FIG. 2A. Referring to FIGS. 2B, 3, and 4, the eccentric rotor assembly comprises: an eccentric shaft 310 which is fitted over the second portion of the main shaft 200 located in the cylindrical inner chamber and has a central axis parallel to the central axis of the main shaft 200 and offset from the central axis of the main shaft by a preset distance; a rolling piston wheel 330 which is fitted over the eccentric shaft 310, has a central axis coinciding with the central axis of the eccentric shaft 310, and has a radius R1; and at least one rolling bearing 320 which is symmetrically fitted over the eccentric shaft 310, and has an inner ring fixed to the eccentric shaft 310 and an outer ring fixed to the rolling piston wheel 330 to isolate rotation of the eccentric shaft from rotation of the rolling piston wheel. The rolling piston wheel is pressed against an inner cylindrical surface of the cylindrical inner chamber by a preloading elastic force between these rolling bearings and the rolling piston wheel, such that the inner cylindrical surface of the cylindrical inner chamber and an outer cylindrical surface of the rolling piston wheel form a sealed chamber extending in an axial direction. An eccentricity e of the eccentric shaft 310 is determined according to factors such as a displacement of the compressor and a fluid pressure. For example, when the displacement is 53 cc, and the pressure is 1 MPa, the eccentricity may be 4.5 mm. The more the displacement is, the more the eccentricity e is.

The main shaft 200 drives the eccentric shaft 310 to rotate. Thereby, the rolling piston wheel 330 is driven by the eccentric shaft 310 such that the rolling piston wheel 330 rotates in such a way as to roll along the inner cylindrical surface of the cylinder block while revolving around the central axis of the main shaft. Rotation of the rolling piston wheel 330 and rotation of the eccentric shaft 310 are isolated from each other by the rolling bearing 320.

The above-mentioned rolling bearing 320 may be a roller bearing, a ball bearing, a needle roller bearing, an aerodynamic rolling bearing or a composition bearing, and is preferably the ball bearing. In FIGS. 2B, 3, and 4, two symmetrical (i.e., one set of) rolling bearings 320 are disposed between the eccentric shaft 310 and the rolling piston wheel 330. Those skilled in the art would understand that the number of the rolling bearings may be designed according to requirements. If an axial length of the cylindrical inner chamber, i.e., a height H of the cylinder block is relatively large, the rolling bearings may comprise two, three or four sets of symmetrical rolling bearings and each set of rolling bearings includes two rolling bearings. Of course, the rolling bearings may also be replaced with a single rolling bearing having a great cross sectional area, but the singe rolling bearing should also be disposed left-right symmetrically along the cylindrical inner chamber.

In a design of a conventional rotor compressor, a displacement and external dimensions of the rotor compressor are all small, and the rotor compressor is particular compact in size due to an eccentric rotor structure and, as described above, a pressure in the housing must be a high pressure for reasons such as one that the lubricating oil must be used to fill a clearance in a position where the cylinder block and a seal sleeve come into contact with each other. Therefore, it has become a custom to use a sliding-contact bearing with lubricating oil. A technique in which a rolling bearing is used between the rolling piston wheel and the eccentric shaft of the rotor compressor for reducing wear has not so far been seen. However, the market requires that the rotor compressor can be developed into a refrigeration compressor that meets large type and low-temperature operating requirements. The existing rotor compressor lubricated by lubricating oil can no longer meet the requirements and thus must be newly changed.

By using, in the rotor compressor, the up-to-date rolling bearing that is mass-produced with mature industrial technology and is also continuously progressing, not only energy loss can be greatly reduced to improve energy efficiency by replacing sliding friction with rolling friction, but it is also hopeful to achieve an oil-free or minimal-oil (i.e., small-range local oil lubrication) rotor compressor by using the rolling bearing, and thus it is hopeful to overcome the defects resulted from using of a great deal of lubricating oil. As a result, the rotor compressor can be applied to large-scale compressors and air compressors.

However, it is noted that, although it is gradually described by referring to the description that it is a necessary trend of the technical development to replace the existing oil lubrication with the rolling bearing, it is not a simple thing to appropriately introduce the rolling bearing into the rotor structure of the compressor to substitute for the current oil-lubricated sliding-contact bearing and to replace the current sliding friction with the rolling friction. Otherwise, the fact that the rolling bearing has not been used in the rotor compressor in prior art cannot be explained.

According to mechanical design experience summarization, if there is a clearance of 0.01-0.03 mm between adjacent moving surfaces, a good airtightness can be obtained. In the rotor compressor according to the embodiment, the rolling bearing is disposed between the eccentric shaft and the rolling piston wheel, and an optimal, low-cost, high-quality basic sealing condition is that there is no relative sliding motion between the moving surfaces. Therefore, there may be no clearance or even slight interference fit between the moving surfaces for achieving zero leakage. In order to achieve the above basic sealing condition, a preloading elastic design is used among the eccentric shaft, the rolling piston wheel and an inner wall of the cylinder block body, thereby achieving an optimal sealing.

A control objective of a sealing clearance between the rolling piston wheel and the cylinder block of the rotor compressor is that it must be ensured that the sealing clearance $\Delta$ at a point of tangency where the rolling piston wheel and the inner wall of the cylinder block come into contact with each other is zero when the rolling piston wheel rolls along the inner wall of the cylinder block. The sealing clearance $\Delta$ is given by the following mathematical formula:

$$\Delta = R - e - r - \psi = 0$$

where $\Delta$ represents the sealing clearance;

R represents a radius of a cylinder of the inner wall of the cylinder block;

r represents a radius of an outer cylinder of the rolling piston wheel;

e represents an eccentricity between the rolling piston wheel and the center of the cylinder block; and $\psi$ represents a radial play of the bearing for supporting the rolling piston wheel.

Therefore, before assembling of the rolling piston wheel of the rotor compressor, the above parameters need to be measured in advance for matching. Since it is not easy to correct each of the radius R of the cylinder of the inner wall of the cylinder block, the eccentricity e between the rolling piston wheel and the center of the cylinder block (i.e., a crankshaft eccentric radius), and the radial play $\psi$ of the rolling bearing once they have been manufactured, a method in which the radius r of the outer cylinder of the rolling piston wheel is corrected and adjusted for matching is usually adopted.

In the embodiment, interference fit between the rolling piston wheel of the rotor compressor and the cylinder block may be adopted for the control objective of the sealing clearance between the rolling piston wheel and the cylinder block of the rotor compressor. In other words, the sealing clearance $\Delta$ is less than zero. This means that the rolling piston wheel and the cylinder block are preloaded at the point of tangency where the rolling piston wheel and the cylinder block come into contact with each other, to be elastically micro-deformed so that the resultant air clearance seal can be expanded from a line to a surface. It should be noted that the preloaded amount should not be too large (the preloaded amount is about 1-100 μm), and should not exceed an elastic range permitted by an assembly dimension chain system, let alone result in an accident that the assembly dimension chain system is permanently deformed. When dimensions of parts of the compressor have been stabilized after the compressor has operated for an early running-in period, the elastic micro-deformation caused by the preloading can automatically compensate for wear and deformation, thereby ensuring the control objective that the sealing clearance $\Delta$ between the rolling piston wheel and the cylinder block of the rotor compressor is not greater than zero. However, in this way, excessively rigorous accuracy requirements for radial fit dimensions of parts constituting the eccentric rotor are often posed at a manufacturing site.

It can be known from the above analysis that it is feasible to press the rolling piston wheel against the inner cylindrical surface of the cylindrical inner chamber by the preloading elastic force between the rolling bearings 320 and the rolling piston wheel 330, thereby achieving sealing between both. Generally, the preloading elastic force may be derived from the interference fit between the rolling bearings 320 and the rolling piston wheel 330. However, if a magnitude of interference of the interference fit is too large, it is possible to result in a problem that the rotor compressor operates poorly.

In order to solve the difficult problem, one or more insertion grooves, which are distributed symmetrically with respect to a radial center line of grooves for rolling elements (which are steel balls for a ball bearing, for example) of the rolling bearing, need to be formed on one of both the inner cylindrical surface of the rolling piston wheel 330 and the outer cylindrical surface of the rolling bearing 320, and an elastic preloading element is disposed in the insertion groove. The elastic preloading element has a height greater than a depth of the insertion groove, in a normal state, thereby achieving the preloading between the inner cylindrical surface of the rolling piston wheel 330 and the outer cylindrical surface of the rolling bearing 330. In addition, the elastic preloading element can also absorb and compensate for an error by itself.

An elastic rubber O-ring 351 widely used may be adopted for the elastic preloading element. The elastic rubber O-ring 351 has a sealing pressure of 1.33×10−5 Pa to 400 MPa, and a dynamic sealing pressure of up to 35 MPa. Material of the elastic rubber O-ring is preferably fluororubber having a good elastic force, wear resistance, pressure resistance and a continuous usage temperature of up to 210° C.

Figure 5A:
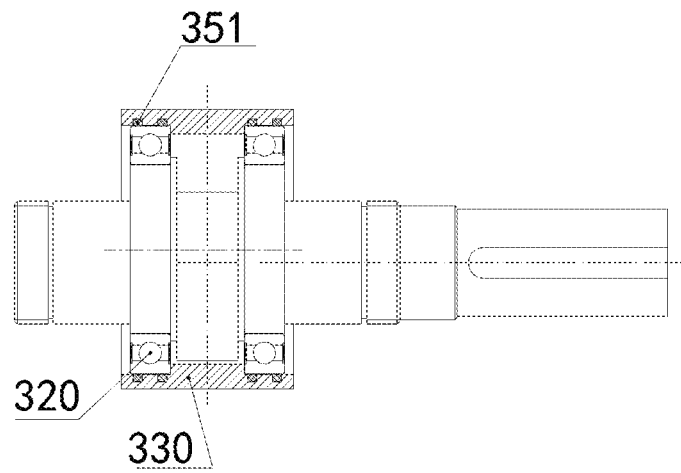
FIG. 5A is a schematic view of a first fitting manner of elastic rubber O-rings in the rotor compressor according to the embodiment of the present invention.

FIG. 5A is a schematic view of a first fitting manner of elastic rubber O-rings in the rotor compressor according to the embodiment of the present invention. As shown in FIG. 5A, a plurality of insertion grooves is formed on the inner cylindrical surface of the rolling piston wheel. Axial positions of the plurality of insertion grooves are evenly distributed symmetrically with respect to a radial center line of grooves for rolling elements (steel balls) of the rolling bearing so that pressure and deformation can be absorbed uniformly. A plurality of elastic rubber O-rings 351 may be inserted in the insertion grooves. When the eccentric main shaft is rotated, the elastic rubber O-rings 351 will be compressed to be elastically deformed by the outer cylindrical surfaces of the rolling bearings, so that the outer cylindrical surface of the rolling piston wheel 330 is tightly pressed against the inner cylindrical surface of the cylinder block, thereby achieving a zero-clearance sealing with a preloading force.

A outer ring of the rolling bearing is preloaded and fixed to an inner cylindrical surface for mounting and positioning the rolling bearing through the elastic rubber O-rings 351, and is floating with respect to a center position of the inner cylindrical surface for mounting and positioning the bearing of the piston wheel. Therefore, a sufficient clearance β needs to be disposed between them to compress the elastic rubber O-rings. An internal diameter Ω of the piston wheel for mounting and positioning the rolling bearing must be greater than an external diameter of the outer ring of the rolling bearing. A quantity of the clearance β is determined depending on a size of the bearing and is in a range of around 0.1-1 mm.

As mentioned above, generally the method of correcting, adjusting and selecting a radius r of the outer cylinder of the rolling piston wheel for fitting is adopted to ensure that the sealing clearance Δ at the point of tangency where a rotor and the inner wall of the cylinder block come into contact with each other is zero when the rotor rolls along the inner wall of the cylinder block. After the rolling piston wheel is preloaded and fixed by means of the elastic rubber O-ring, there is the clearance β between an outer cylindrical surface of the outer ring of the rolling bearing and the inner cylindrical surface for mounting and positioning the rolling bearing. In this case, the radial play ψ of the rolling bearing for supporting the rolling piston wheel is zero.

After a value Δr is added to the radius r of the outer cylinder of the rolling piston wheel in advance, the sealing clearance Δ is given by the following mathematical formula:

$$\Delta=R-e-(r+\Delta r)=0$$

where: Δ represents the sealing clearance;
R represents the radius of the cylinder of the inner wall of the cylinder block;
r represents the radius of the outer cylinder of the rolling piston wheel;
e represents the eccentricity between the rolling piston wheel and the center of the cylinder block; and
Δr represents a value that is added to the radius r of the outer cylinder of the rolling piston wheel in advance.

The clearance between the outer cylindrical surface of the outer ring of the rolling bearing and the cylindrical surface of the rolling piston wheel is β. If a quantity by which the clearance β is reduced due to compression is set to be Δβ, and the radial play of the rolling bearing is ψ, Δr is given by the following mathematical formula:

$$\Delta r=\psi+\Delta\beta$$

A reaction force caused by compression deformation of the elastic rubber O-ring is in direct proportion to the quantity of change Δβ of the clearance β. The relationship between them is given by the following mathematical formula:

$$0<\Delta\beta\leq\beta$$

Therefore, in design, a value of Δβ must be correctly selected according to practical experience, it is necessary that there is just a moderate elastic preloading pressure at the point of tangency where the outer cylindrical surface of the rolling piston wheel and the cylindrical surface of the inner wall of the cylinder block come into contact with each other, while ensuring the sealing clearance Δ is zero, and that excessive preloading is avoided.

Figure 5B:
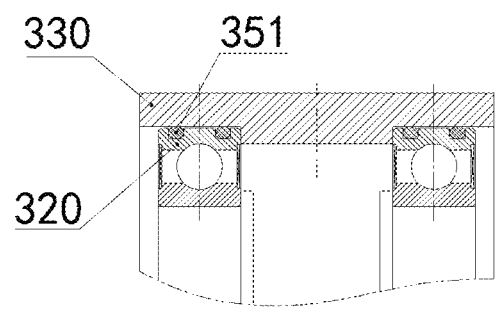
FIG. 5B is a schematic view of a second fitting manner of elastic rubber O-rings in the rotor compressor according to the embodiment of the present invention.

FIG. 5B is a schematic view of a second fitting manner of elastic rubber O-rings in the rotor compressor according to the embodiment of the present invention. The fitting manner of the elastic rubber O-rings shown in FIG. 5B is similar to that shown in FIG. 5A, but different from that shown in FIG. 5A in that the insertion grooves are formed on the outer cylindrical surface of the outer ring of the rolling bearing. The operational principle of the elastic rubber rings shown in FIG. 5B is the same as that shown in FIG. 5A, and thus is no longer redescribed.

For the elastic rubber O-rings shown in FIGS. 5A and 5B, values of dimensions of cross section of them are a key in design. Here, it is important to satisfy the following three conditions:

(1) an appropriate elastic preloading pressure is transmitted to the position where the outer cylindrical surface of the rolling piston wheel and the cylindrical surface of the inner wall of the cylinder block come into contact with each other, by the rotor system through the elastic rubber O-rings;

(2) a diameter of a cross section of the elastic rubber O-ring should be great enough and a contact area between the elastic rubber O-ring and the inner cylindrical surface of the rolling piston wheel for mounting and positioning the rolling bearing should also be great enough to satisfy requirements that the system has an elasticity flexible enough to absorb vibration and noise; and (3) since the elastic rubber O-ring is repeatedly pressed and deformed at a contact point between the piston wheel and the inner wall of the cylinder block, a cross sectional area of the elastic rubber O-ring should be great enough to have a sufficient fatigue strength and not to be permanently deformed.

A standard bearing called an expansion compensation deep groove ball bearing (a slip prevention bearing) is on the market. Two rectangular-section grooves are formed on an outer cylindrical surface of an outer ring of the standard bearing, and polymeric material having high expansivity is inserted in the grooves to prevent the bearing from being loosed from a bearing positioning part due to thermal expansion after a system temperature is increased. Another standard bearing called an AC bearing (a slip prevention bearing) is on the market. Two rectangular-section grooves are formed on an outer cylindrical surface of an outer ring of the standard bearing, and rubber O-rings are inserted in the grooves to prevent the bearing from slipping when the outer ring of the bearing cannot be fixed by means of an interference fit. However, the main purpose of the above two types of bearings is to prevent slipping and thermal expansion, and is essentially different from the main purpose of sealing accomplished by the preloading elastic force between the rolling bearing and the rolling piston wheel in the embodiment of the present invention.

In addition, bearing capacity and stability of the above rolling bearings themselves will be seriously affected due to the grooves disposed in their outer rings. Therefore, it is not advocated to directly use, without calculation, the above-mentioned standard bearings for preventing slip which are rare on the market, but it is advocated to use common ball or roller bearings on the market and to form the insertion grooves on the inner cylindrical surface of the rolling piston wheel 320. In this way, the rotor compressor is more reasonable in entire structure, more diverse in form, and more excelsior in effect.

To this end, a cross-sectional shape of the elastic rubber ring may also be designed to be rectangular or other more shapes that facilitate satisfying the requirements of an appreciate elastic preloading pressure, absorption of vibration and noise, and a sufficient fatigue strength to prolong a service life. One of the solutions is the rectangular-section elastic rubber rings 352 with teeth as shown in FIG. 5C.

Figure 5C:
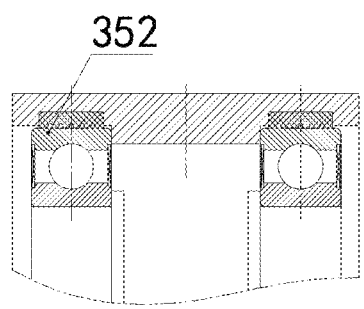
FIG. 5C is a schematic view of a fitting manner of rectangular-section elastic rubber rings in the rotor compressor according to the embodiment of the present invention.

As shown in FIG. 5C, since the groove for inserting the rectangular-section elastic rubber rings 352 with teeth has a width that is almost the same as a width of the ring of the bearing, the insertion groove should be no longer formed on the bearing ring which is inherently a thin-wall structure, but the insertion grooves can be formed on only the inner cylindrical surface of the rolling piston wheel for mounting and positioning the rolling bearing. In this way, the insertion groove can be formed to be greater in depth so that a space for elastic deformation is larger. When the rectangular-section elastic rubber rings 352 with teeth is assembled, it can operate for a long period of time by applying lubricating grease to its teeth.

It is particularly noteworthy that, when the eccentric main shaft is operated at a high speed, the elastic rubber O-ring or the rectangular-section elastic rubber ring are probably softened and even damaged due to generation of heat after they have operated under the action of a high-frequency repeated impact pressure for a long time. Therefore, adoption of more heat-resistant high-strength elastic material, such as an elastic ring made of a net of stranded fine metal wires or a metal spring sleeve, needs to be considered. The metal is preferably an alloy steel, or other metal material having a large elasticity.

Figure 6A:
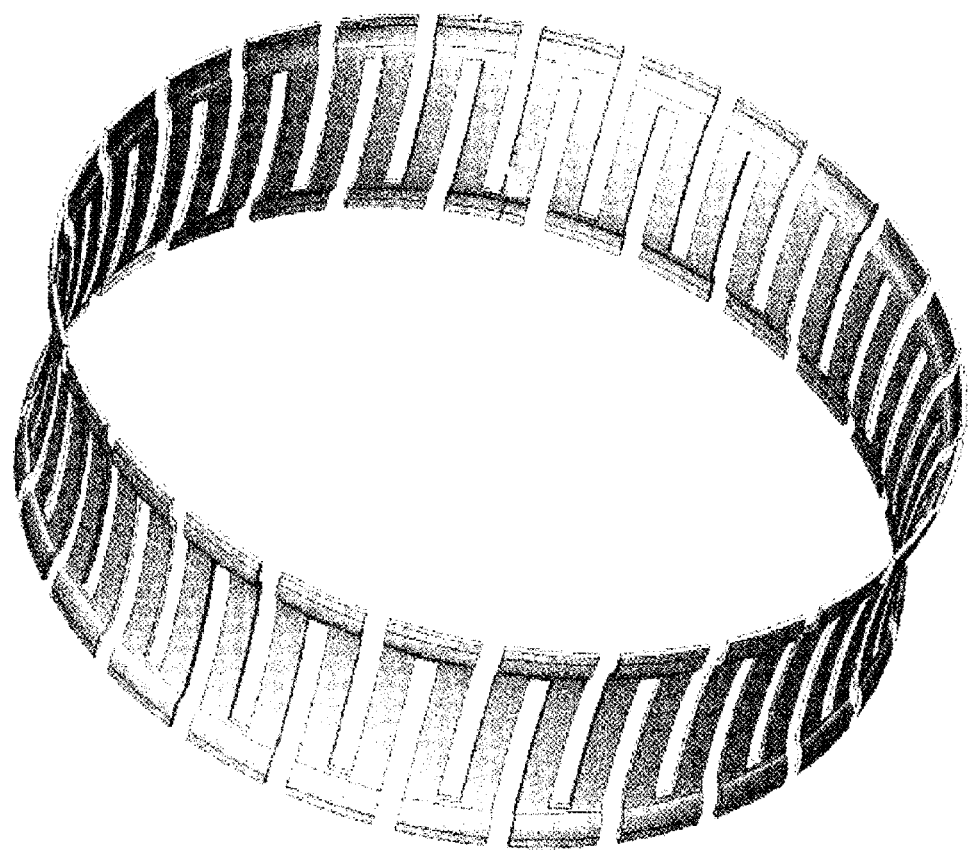
FIG. 6A is a schematic view of a spring plate sleeve in an eccentric rotor assembly of the rotor compressor according to the embodiment of the present invention.

FIG. 6A is a schematic view of a spring plate sleeve in an eccentric rotor assembly of the rotor compressor according to the embodiment of the present invention. Referring to FIG. 6A, the metal spring sleeve comprises: a spring plate having a continuous smooth U-shaped arc-curved arch, and rigid base edges supporting the spring plate. The rigid base edges can be elastically contracted or reduced in diameter.

Figure 6B:
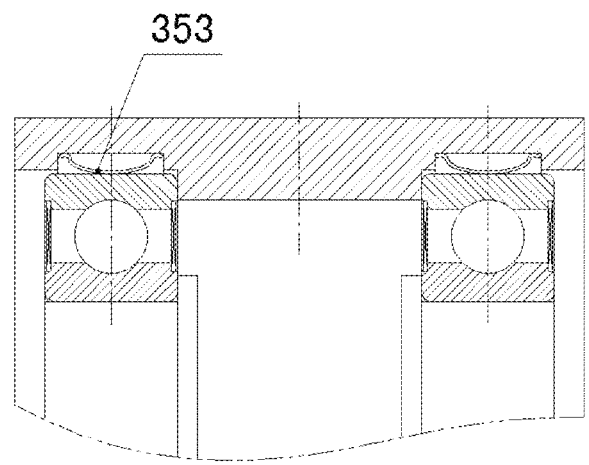
FIG. 6B is a schematic view of the spring plate sleeve shown in FIG. 6A in a fitted state.

As shown in FIG. 6B, insertion grooves are formed on the inner cylindrical surface of the rolling piston wheel, and the groove has a central line coinciding with a central line of the rolling bearing. The metal spring sleeve 353 having the smooth U-shaped arc-curved arch is assembled in the insertion groove. When the metal spring sleeve 353 is assembled, since the rigid base edges of the metal spring sleeve 353 can be elastically contracted in diameter, the metal spring sleeve 353 can be inserted in the rectangular-section groove, formed on the inner cylindrical surface for mounting and positioning the rolling bearing, to be positioned in advance. After lubricating agent is applied to the metal spring sleeve 353, the outer ring of the rolling bearing can be easily pressed and assembled into the metal spring sleeve. Since a pressing technology is used, the metal spring sleeve can be easily mass-produced on a large scale, thereby ensuring quality and reduce a cost.

In this embodiment, with the elastic preloading element mounted between the outer cylindrical surface of the outer ring of the rolling bearing and the inner cylindrical surface, for mounting and positioning the rolling bearing, of the rolling piston wheel, when the eccentric main shaft is rotated, the outer cylindrical surfaces of the rolling bearings will compress the elastic preloading element to generate an elastic deformation force so that the outer cylindrical surface of the rolling piston wheel is tightly pressed against the inner cylindrical surface of the cylinder block. Regardless of what accuracy error the radial fit dimensions of parts constituting the eccentric rotor assembly have and also regardless of what deviation and run-out tolerance an outer circular trajectory formed by rotation of the eccentric rotor assembly has in a radial direction, all of them can be randomly absorbed by elastic deformation of the elastic preloading element to ensure achieving a zero-clearance sealing with an elastic preloading force. Therefore, not only a quality target of good reliable sealing of the eccentric rotor assembly of the compressor can be achieved, but excessively rigorous accuracy requirements for radial fit dimensions of parts constituting the eccentric rotor assembly can also be avoid and the cost is also reduced.

In order to save a space in the cylinder block, eccentric shaft shoulders 311 are disposed at positions of the eccentric shaft over which the rolling bearings are fitted. as shown in FIG. 3. A portion of the eccentric shaft exclusive of the eccentric shaft shoulders 311 can be saved for weight counterbalancing. A specific weight counterbalancing method is described as below.

Referring to FIGS. 2A, 3, and 4, a counterbalance 340 is symmetrically disposed along the eccentric shaft between the two eccentric shaft shoulders on a lighter side of the eccentric shaft. Dimension and weight of the counterbalance 340 are determined depending on volume of the cylindrical inner chamber and the eccentricity.

In addition, the present invention also provides other weight counterbalancing manners, in addition to the above-mentioned weight counterbalancing manner.

Figure 7A:
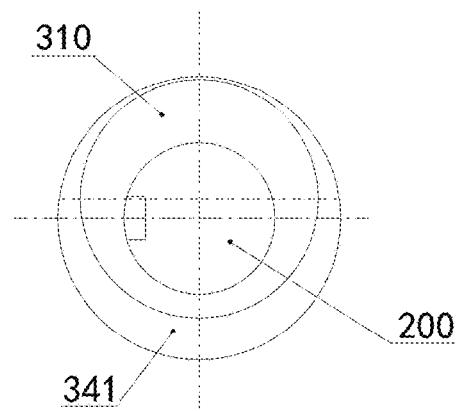
FIG. 7A is a left view of the eccentric rotor assembly in the rotor compressor according to the embodiment of the present invention.

In a first weight counterbalancing manner, the counterbalance 341 in the eccentric rotor assembly is no longer one separate piece, but is an arc-shaped joined counterbalance region on the lighter side of the eccentric shaft, as shown in FIG. 7. This kind of counterbalance can be easily manufactured and is good in balancing effect.

Figure 7B:
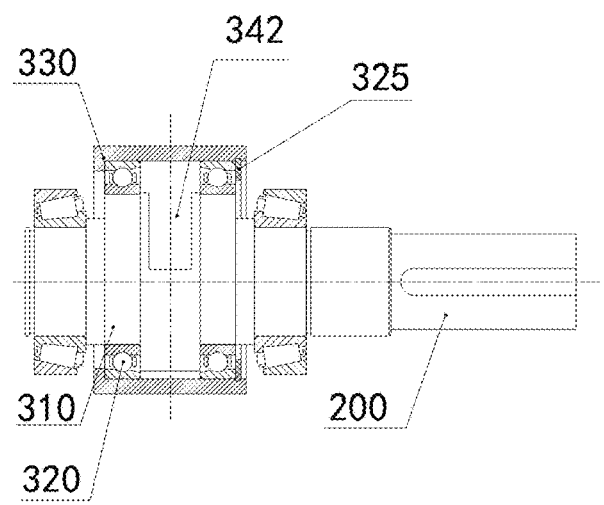
FIG. 7B is a schematic view of the eccentric rotor assembly in the rotor compressor according to the embodiment of the present invention.

In a second weight counterbalancing manner, a weight counterbalancing notch 342 is formed on a heavier side of the eccentric shaft to reduce a counterweight at this position, in the eccentric rotor assembly, thereby achieving a balance during rotation of the eccentric shaft, as shown in FIG. 7B.

In other weight counterbalancing manners, a plurality of weight counterbalancing holes may also be formed on the heavier side of the eccentric shaft to reduce a counterweight. In addition, the eccentricity between the eccentric shaft and the main shaft may also be reduced to the maximum extent in manufacturing of the eccentric shaft and the weight counterbalancing is accomplished even in a concentric manner.

In prior art, although importance of momentum balance has already been well known, the momentum balance is seldom achieved in quite a few rotor compressors at present. That is because a space is too narrow due to a sliding-contact bearing of an eccentric shaft and adoption of oil lubricating and oil sealing techniques, so that it is difficult to perform weight counterbalancing. With the rolling bearing, the present invention makes it possible to carry out a design of a weight counterbalancing structure for momentum balance of the rotor between span spaces of the two rolling bearings arranged symmetrically. With the weight counterbalancing solution, a problem of momentum unbalance of the rotor compressor caused by eccentric rotation is alleviated, and the rotor compressor further conforms to principles of precision machine technology. Of course, the rotor compressor subjected to rotor momentum balanced design is low in vibration and noise in operation.

In order to achieve positioning of the rolling bearings and avoid offsetting of the rolling piston wheel during rotation, axial positioning of the inner and outer rings of the two rolling bearings fixed to the eccentric rotor assembly of the compressor belongs to a preloading positioning. An axial play of the rolling bearing is eliminated by the inner cylindrical surface of the rolling piston wheel and the positioning shaft shoulder on a journal of the eccentric main shaft. As a result, axial swaying of the rolling bearing is reduced in rotation. The rolling piston wheel may be positioned in anyone of the following two manners.

I. As shown in FIG. 2A, axial positioning of the inner rings of the two rolling bearings fixed to the inner cylindrical surface of the rolling piston wheel is accomplished by the shaft shoulders disposed on the journals of the eccentric main shaft and bearing pressing washers 331 disposed on the journals of the main shafts. The shaft shoulders abut against the inner rings of the two rolling bearings outwards from an inside between the two rolling bearings, respectively, and outer sides of the inner rings of the rolling piston bearings are pressed and positioned by the bearing pressing washers from both sides of the cylinder block, thereby achieving axial positioning of the inner rings of the two or more rolling bearings. The outer rings of the two rolling bearings are positioned by applying pressing forces to inner side surfaces of the outer rings by means of shoulders disposed at a middle of the inner cylindrical surface of the rolling piston wheel.

II. As shown in FIG. 7B, axial positioning of the inner rings of the two rolling bearings fixed to the inner cylindrical surface of the rolling piston wheel is accomplished by the shaft shoulders disposed on the journals of the eccentric main shaft. The shaft shoulders abut against the inner rings of the two rolling bearings outwards from an inside between the two rolling bearings, respectively. The outer ring of one of the two rolling bearings is positioned by applying, by means of a shoulder disposed at a left end of the inner cylindrical surface of the rolling piston wheel, a pressing force to a side surface of the outer ring of the one of the two bearings adjoining the shoulder, and an outer side surface of the outer ring of the other bearing is locked inwards and positioned by a bearing snap ring 325 that is disposed in a groove at a right end on the inner cylindrical surface of the rolling piston wheel.

Of course, the positioning manner of the rolling bearings of the rotor compressor according to the present invention is also not limited to the above two manners. A person having ordinary skill in the art could also conceive other positioning manners according to the above description.

In addition, sealing at side surfaces of the rolling piston wheel is very important. Side gaskets 321 are disposed on both sides of the rolling piston wheel. Side gasket elastic rubber rings 322 inserted in the front and rear cylinder covers are pressed against outer sides of the side gaskets 321 with appropriate forces, respectively, in order to prevent leakage. The side gaskets 321 may be made of a wear reducing alloy or polytetrafluoroethylene (PTFE) material.

As shown in FIGS. 2A and 2B, the partition mechanism 400 partitions a sealed chamber, formed by the inner cylindrical surface of the cylinder block and the outer cylindrical surface of the rolling piston wheel and extending in the axial direction, into a first chamber and a second chamber. For a compressor, the first chamber is a suction chamber 430 in communication with a low-pressure compression medium input opening through a suction through hole 401, and the second chamber is a compression chamber, i.e., a high-pressure chamber, in communication with a discharge opening for a high-pressure compression medium that has been compressed, through a discharge through hole 402. A torque on an outside of the cylindrical inner chamber is transmitted to an inside of the cylindrical inner chamber by the main shaft 200, so that the compression medium is compressed by means of the eccentric rotor assembly. It should be noted that an opening/closing valve 427 is provided between the discharge through hole 402 and the high-pressure compression medium discharge opening 404. Only when a gas pressure in the discharge through hole 402 reaches a preset pressure threshold value, the opening/closing valve 427 is opened to output compression medium that has been compressed to the high-pressure compression medium discharge opening. When the gas pressure in the discharge through hole 402 does not reach the preset pressure threshold value, the opening/closing valve 427 is closed all along.

The partition mechanism 400 comprises a rotary valve body 410 and a rotary valve body resetting mechanism. The rotary valve body is preferably a sheet-shaped structure, i.e., a rotary valve sheet. The rotary valve body may also be a semicircular structure as shown in FIG. 1 or the like. Of course, those skilled in the art should also understand that in addition to the rotary valve body and its resetting mechanism described later, other types of valve bodies and corresponding resetting mechanisms may also be used, for example, a gate valve and the like, referring to the preceding application (Application Number 201110322746.0) filed by the present applicant. Their mounting manners are well known by those skilled in the art and are no longer described in detail.

On the cylinder block body 111, an accommodation groove extending in the axial direction and open towards the cylindrical inner chamber is formed at a position corresponding to the cylinder head 140. The rotary valve body 410 is mounted in the accommodation groove and is rotatably supported by the accommodation groove such that the rotary valve body 410 swings within a predetermined angle range. When the eccentric rotor assembly is rotated to an upper position, the rotary valve body 410 is pressed into the accommodation groove and is in a pressed-in state. When the eccentric rotor assembly is rotated to a lower position, the rotary valve body swings to its maximal position and is in a protruded state. An end of the rotary valve body is pressed against the outer cylindrical surface of the rolling piston wheel all along so that the first chamber is isolated from the second chamber. When the rotary valve body swings out from the accommodation groove, the chamber that a front surface of the rotary valve body faces is the second chamber, i.e., the compression chamber 440, which is in communication with the discharge opening 404 for a high-pressure compression medium that has been compressed, through the discharge through hole 402, while the chamber that a back surface of the rotary valve body faces is the first chamber, i.e., the suction chamber 430, which in communication with the low-pressure compression medium input opening through the suction through hole 401.

For the rotary valve body, eccentric motion of the rolling piston wheel is a process for continuously driving a cam within a range of 360 degrees. During the process, a rise angle of the cam is very small. Therefore, a very small torque inputted from the main shaft can generate a great pushing force for the rotary valve body to achieve an effect of compressing high-pressure gas or liquid, while ensuring that a head of the rotary valve is maintained to be pressed against the outer cylindrical surface of the rolling piston wheel for sealing all along.

Referring to FIG. 2B, the rotary valve body 410 is mounted in the accommodation groove and is rotatably supported by the accommodation groove. The rotary valve body 410 comprises a connection part located at a root portion of the rotary valve body and hinged to the accommodation groove; and a main body configured to swing within the predetermined angle range with the connection part serving as a shaft.

Specifically, a sliding cylindrical hole having an arc-shaped notch is disposed in the accommodation groove, and the arc-shaped notch of the sliding cylindrical hole is in communication with the accommodation groove. The connection part is a support cylinder. The support cylinder is inserted in the sliding cylindrical hole and is positioned by being wrapped and constrained by the sliding cylindrical hole. The main body of the rotary valve body swings freely between the pressed-in state and the protruded state within the predetermined angle range with the support cylinder serving as a shaft. Preferably, an angle of the arc-shaped notch of the sliding cylindrical hole is about 110°, and a corresponding amplitude at which the main body of the rotary valve body can swing is greater than 250°.

A height of the support cylinder should be slightly lower than a height H of the cylinder block, preferably with a clearance of about 0.01 mm on each side. In this way, the rotary valve body is nimble in movement and no leakage will occur. In addition, a lubricating measure should be adopted for fitting surfaces of the support cylinder and the sliding cylindrical hole. For example, lubricating agent is provided, or a surface of the support cylinder is plated with polytetrafluoroethylene (PTFE). Among plastics, the polytetrafluoroethylene (PTFE) has the best aging lifetime, and among solid materials, the polytetrafluoroethylene (PTFE) has the lowest coefficient of friction.

Of course, a spindle structure disclosed in the patent application (Application Number: 201010196950.8) filed by the present applicant previously may also be used for the rotary valve body 410. However, compared with the spindle structure, by means of the rolling cylinder of this embodiment, there is no need to form a spindle positioning hole in the cylinder cover, so that manufacturing easiness is greatly improved, the assembling is simply, the accuracy is improved, and the cost is reduced.

As shown in FIG. 2B, a rolling wheel is also disposed at the rotary valve body head. When the rotary valve body is moved relative to the rolling piston wheel, the rolling wheel rolls so that friction between the rotary valve body and the rolling piston wheel is decreased to the maximum extent.

When the eccentric shaft rotates one rotation, the rolling piston wheel runs one revolution without sliding while it is pressed elastically against the inner wall of the cylinder block by the rolling bearings. Since the diameter of the cylinder block is greater than the diameter of the rolling piston wheel, when the rolling piston wheel revolves one revolution, the outer ring of the bearing of the rolling piston wheel rotates much less than one rotation (the rotation direction is opposite to the revolution direction). This means that a speed of relative sliding at a position where a structure of the rotary valve body head and an outer cylindrical surface of the rolling piston wheel come into contact with each other can be greatly reduced, thereby especially facilitating sealing.

In addition to the structure of the rotary valve body head shown in FIG. 2B, the present invention also provides other structures of the rotary valve body head.

Figure 8A:
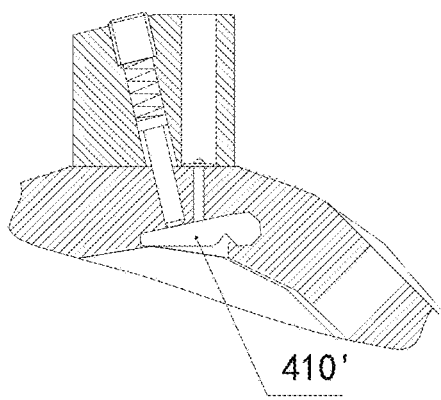
FIGS. 8A and 8B are schematic views of a second type of rotary valve body, respectively in a pressed-in state and a protruded state, in a partition mechanism of the rotor compressor according to the embodiment of the present invention.
Figure 8B:
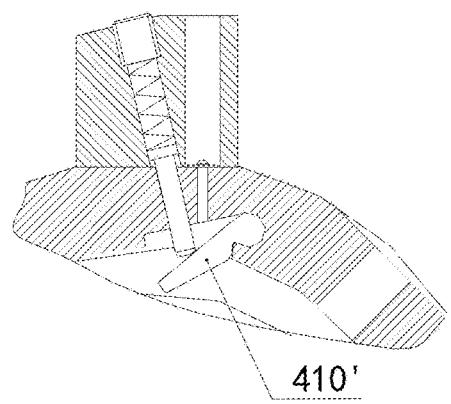

FIGS. 8A and 8B are schematic views of a second type of rotary valve body, respectively in a pressed-in state and in a protruded state, in a partition mechanism of the rotor compressor according to the embodiment of the present invention. In the rotary valve body 410' as shown in FIGS. 8A and 8B, the entire rotary valve body is made of wear reducing material or a surface of the rotary valve body is plated with the wear reducing material. The wear reducing material may be silicon nitride ceramics, polytetrafluoroethylene, bronze alloy and the like. In actual operation, not only contact surfaces of the head of the rotary valve body 410' and the rolling piston wheel will naturally form sealing due to running-in, but friction wear amount can also be compensated for automatically as the amplitude of swing of the rotary valve body becomes greater.

Figure 9:
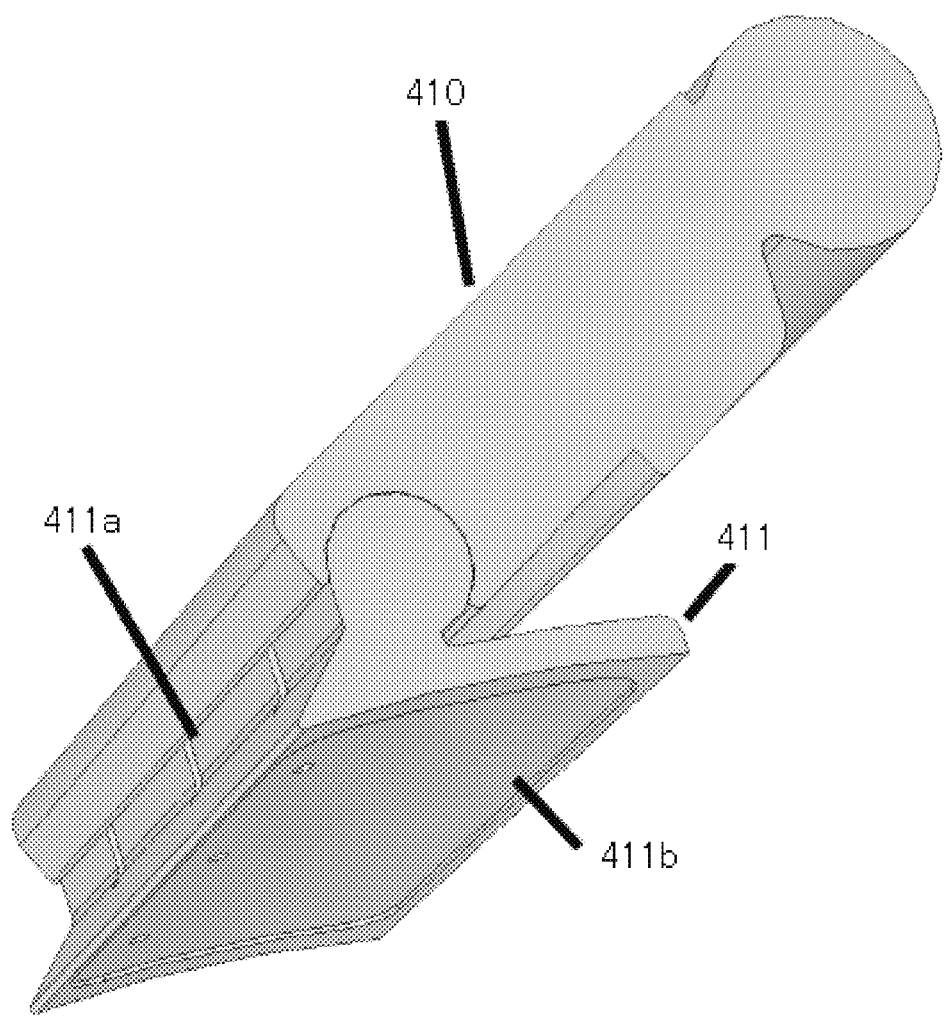
FIG. 9 is a perspective view of a third type of rotary valve body in the partition mechanism of the rotor compressor according to the present invention.
Figure 10A:
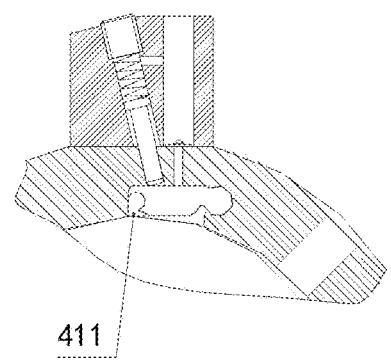
FIGS. 10A and 10B are schematic views of the rotary valve body, respectively in a pressed-in state and a protruded state, shown in FIG. 9.
Figure 10B:
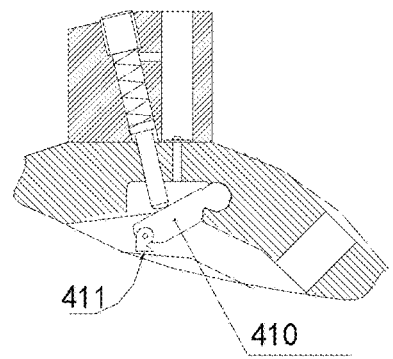

FIG. 9 is a perspective view of a third type of rotary valve body in the partition mechanism of the rotor compressor according to the present invention. FIGS. 10A and 10B are schematic views of the rotary valve body shown in FIG. 9, respectively in a pressed-in state and in a protruded state. Referring to FIGS. 9, 10A, and 10B, the rotary valve body 410 also comprises a swing seal slider 411. A head of the swing seal slider has a cylindrical shape, and is swingably positioned in a sliding cylindrical hole, located in an end of the main body of the rotary valve body, by being wrapped and constrained by the sliding cylindrical hole. A surface of the swing seal slider 411 coming into contact with the rolling piston wheel 330 is a sealing arc surface. The sealing arc surface abuts against the rolling piston wheel 330 and is slidable on the surface of the rolling piston wheel 330. FIG. 10A shows a situation in which the rolling piston wheel rotates to the highest position in the cylinder block. In this case, the main body of the rotary valve body and the swing seal slider 411 mounted to the head of the main body of the rotary valve body are retracted into the groove of the cylinder block together. FIG. 10B shows a situation in which the rolling piston wheel roller rotates to the lowest position in the cylinder block. In this case, the main body of the rotary valve body and the swing seal slider 411 mounted to the head of the rotary valve body are rotated out from an inside of the groove of the cylinder block in a counterclockwise direction under the action of a pushing force of a valve plate resetting pin, while the swing seal slider 411 is pressed against the outer cylindrical surface of the planetary piston roller all along. This arc surface-shaped seal of a bottom surface of the swing seal slider and the outer cylindrical surface of the planetary piston roller has a better effect. In addition, since there is a larger sealing area, a load pressure can be dispersed to the maximum extent.

Since a speed of relative motion between the bottom surface of the swing seal slider 411 and the outer cylindrical surface of the planetary piston roller 330 is relative great, wear reducing design of the swing seal slider must be performed by strictly conforming to wear reducing requirements of the tribology, selecting an appropriate lubricating method, and referring to a form of bearing bush for close function requirements. Appropriate metal material such as tin bronze, beryllium bronze, tin phosphorus bronze and the like may be selected for material of the swing seal slider 411, or engineering plastics such as fiber strengthened thermo-hardened polyphenolic aldehyde, polytetrafluoroethylene and the like may also be used for the material of the swing seal slider 411. Preferably, the bottom surface of the swing seal slider 411 and the outer cylindrical surface of the planetary piston roller are plated with a layer of polytetrafluoroethylene, so that the friction can be reduced.

As shown in FIG. 9, a compression gas and liquid passage 411a is formed at the head of the swing seal slider 411 of the rotary valve body. The compression gas and liquid passage 411a can ensure that the compression medium can successfully enter a secondary compression chamber through the compression gas and liquid passage even in a moment when the rotary valve body is about to enter into the accommodation groove.

In addition, a shallow hydrostatic bearing pressure chamber 411b is formed on the arc-shaped bottom surface of the swing seal slider 411 and has a depth of 0.1 mm-2 mm. During operation of the rotor compressor, fluid such as gas and liquid distributed in the hydrostatic bearing pressure chamber 411b plays a role similar to that of lubricating oil and can greatly reduce friction between the swing seal slider 411 and the outer cylindrical surface of the rolling piston wheel 330.

In addition, connection manner of the swing seal slider and the main body of the rotary valve body is not limited to the manner in which the rolling cylinder is used. Likewise, manners such as pin joint, spindle and the like may also be used so long as it can be ensured that the swing seal slider is rotatably connected to the rotary valve sheet body. Here, connection manner of the swing seal slider and the main body of the rotary valve body is no longer described in detail.

As shown in FIGS. 2A and 2B, the resetting mechanism is used to cause the rotary valve body to be pressed against the outer cylindrical surface of the rolling piston wheel all along. As shown in FIG. 2B, a pin blind hole is formed in a bottom of the accommodation groove at a position laterally opposite to the rotary valve body. A resetting pin spring 422 is placed in the pin blind hole, and the resetting pin 421 is inserted in the pin blind hole to abut against a free end of the resetting pin spring 422 in a slidable seal manner. A head of the resetting pin 421 pushes the main body 410 of the rotary valve body in a direction towards the rolling piston wheel, thereby achieving resetting and sealing of the rotary valve body. Preferably, an included angle between a central axis of the pin blind hole and a perpendicular of the accommodation groove into which the rotary valve body is pressed is between 10° and 20°, and preferably 13°, as shown in FIG. 2B. A contact point between the resetting pin 421 and the rotary valve body is at a distance of ⅕ to ½ and preferably ⅖ of a length of the rotary valve body from an end of the rotary valve body pressed against the rolling piston wheel.

In this embodiment, by reciprocating motion of the resetting pin for the rotary valve body under gastight sliding conditions, a resetting pushing force is transmitted to the head of the rotary valve body, thereby improving service life and reliability of the resetting spring and the rotary valve body in the rotor compressor. Such a design enlarges a designed space for the rotary valve body resetting mechanism, unlike the conventional rotor compressor in which a designed space for a rotary valve body resetting mechanism is limited to only a narrow space of a support spindle of the rotary valve body.

In addition, a compression spring which has been proved to be reliable in practice is used as the spring serving as a power for resetting the rotary valve body. Since a point where the pushing force is applied by the resetting pin for the rotary valve body is close to the rotary valve body head, a contact pressure of the rotary valve body head (for example, the roller or the bottom surface of the swing seal slider) pressed against the outer cylindrical surface of the planetary piston roller can be accurately ensured to a much greater extent, thereby achieving long-lifetime reliable sealing with a minimum sliding frictional force.

In addition to the above-mentioned rotary valve body resetting mechanism, the present invention also provides two other types of rotary valve body resetting mechanisms.

Figure 11A:
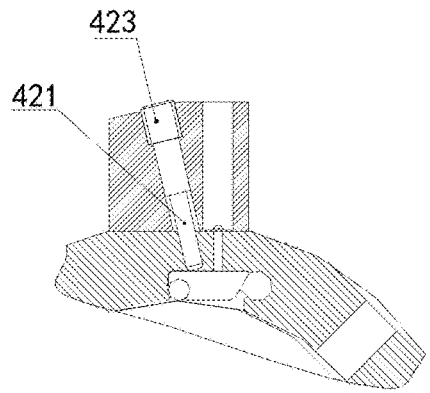
FIG. 11A is a schematic structural view of a second type of rotary valve body resetting mechanism in the partition mechanism of the rotor compressor according to the embodiment of the present invention.

FIG. 11A is a schematic structural view of a second type of rotary valve body resetting mechanism in the partition mechanism of the rotor compressor according to the present invention. As shown in FIG. 11A, a nitrogen gas spring 423 is disposed in the pin hole, and a free end of the nitrogen gas spring abuts against a moving end of the resetting pin 421. The resetting pin 421 pushes the rotary valve body, thereby achieving resetting of the rotary valve body towards the outer cylindrical surface of the rolling piston wheel 430 and sealing between the rotary valve body and the outer cylindrical surface of the rolling piston wheel 430. The nitrogen gas spring has characteristics of good tightness, strong force and long lifetime. The nitrogen gas spring serving as a standard part can also be easily replaced once damaged. In this case, the pin hole may be a through hole, and the pin hole is tightly isolated from an outside of the cylinder by an end of the nitrogen gas spring 423.

Figure 11B:
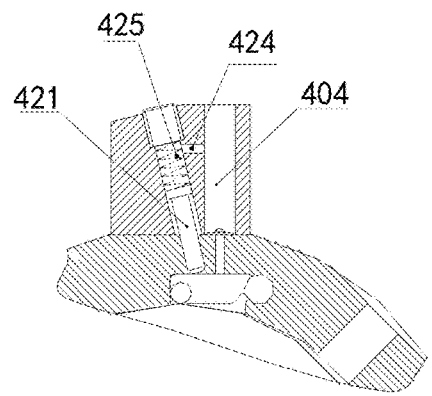
FIG. 11B is a schematic structural view of a third type of rotary valve body resetting mechanism in the partition mechanism of the rotor compressor according to the embodiment of the present invention.

FIG. 11B is a schematic structural view of a third type of rotary valve body resetting mechanism in the rotor compressor according to the embodiment of the present invention. As shown in FIG. 11B, compressed high-pressure gas is introduced by a high-pressure gas passage 424 from the high-pressure compression medium discharge opening 404 into the pin hole which is located above the valve plate resetting pin and in which a compression spring 425 is mounted. The high-pressure gas serving as an spring element can ensure that there is a gas pressure enough to push the resetting pin 421, and to reset the distal end of the rotary valve body towards the outer cylindrical surface of the rolling piston wheel 430 and to seal the distal end of the rotary valve body against the outer cylindrical surface of the rolling piston wheel 430, all along. Here, the compression spring 425 is only used to push the valve plate resetting pin when there is no pressure in a high-pressure cylinder. The compression spring 425 may be omitted on the premise that it can be ensured that the valve plate resetting pin can be pushed reliably even when there is no pressure in the high-pressure cylinder. Preferably, a pressure adjusting device such as a one-way valve or a relief valve is disposed between the high-pressure compression medium discharge opening 404 and the high-pressure gas passage 424 of the compressor, so that it can be ensured that a pressure in the pin hole above the valve plate resetting pin is substantially constant.

In the rotor compressor according to this embodiment, the resetting pin for the rotary valve body operates under gastight sliding conditions, and a resetting pushing force is transmitted to the head of the rotary valve body by the resetting pin for the rotary valve body, thereby improving service life and reliability of the resetting spring in the rotor compressor and thus providing a practical compressor having a high reliability.

Configurations of components of the rotor compressor according to this embodiment have been completely explained in the above description. Three working strokes, i.e., a suction stroke, a primary compression stroke and a secondary compression stroke, of the rotor compressor according to this embodiment will now be explained.

In the suction stroke, as shown in FIG. 12A, the rolling piston wheel is located at an upmost position in the cylindrical inner chamber so as to completely press the rotary valve body into the accommodation groove, and the pin is located at an innermost position in the pin hole. In this case, its diameter makes an angle of 0° with a vertical upward direction, and a compression chamber surrounded by the outer cylindrical surface of the rolling piston wheel and the inner cylindrical surface of the cylinder block is maximal and is in communication with a suction opening of the compressor so that gaseous compression medium is sucked into the compression chamber.

In the primary compression stroke, as shown in FIG. 12B, the rolling piston wheel eccentrically rolls tightly along the inner surface of the cylinder block. Only after the rolling piston wheel rolls past the suction opening, the compression can be started. The rotary valve body is first opened gradually and then closed slowly, and correspondingly, the pin is first protruded from the pin hole and then retracted into the pin hole. As the rolling piston wheel rolls tightly along the inner surface of the cylinder block, a volume of the compression chamber becomes smaller and smaller. As shown in FIG. 12C, the rolling piston wheel is located at a lowermost position in the cylindrical inner chamber. After the rolling piston wheel rolls past this point, it reaches a position as shown in FIG. 12D. After the gas in the compression chamber is compressed to increase in pressure, it gradually enters a cylinder above the rotary valve body.

In the secondary compression stroke, as shown in FIG. 12E, an internally tangent point between an outer circle of the eccentric roller and an inner circle of the cylinder block is located at a 270-degree azimuth. In this case, a position of the internally tangent point has approached an end position. The rolling piston wheel eccentrically rolls tightly along the inner surface of the cylinder block and the rotary valve body is closed quickly. The high-pressure gas blows a valve sheet of a check valve to open. After the gas is compressed to increase in pressure and then enters the cylinder above the rotary valve body, it is further secondarily pressed by the rotary valve body and then enters a high-pressure gas storage chamber. As shown in FIG. 12A, the end position is where the rotary valve body returns to the groove of the cylinder block. In this case, the fluid detained in the so-called secondary compression chamber (high-pressure chamber) is all squeezed into the high-pressure gas storage chamber and in a sequent period of time, the fluid is blocked by the valve plate of the check valve as shown in FIG. 2B.

So far the rotor compressor according to this embodiment has been explained.

Figure 13:
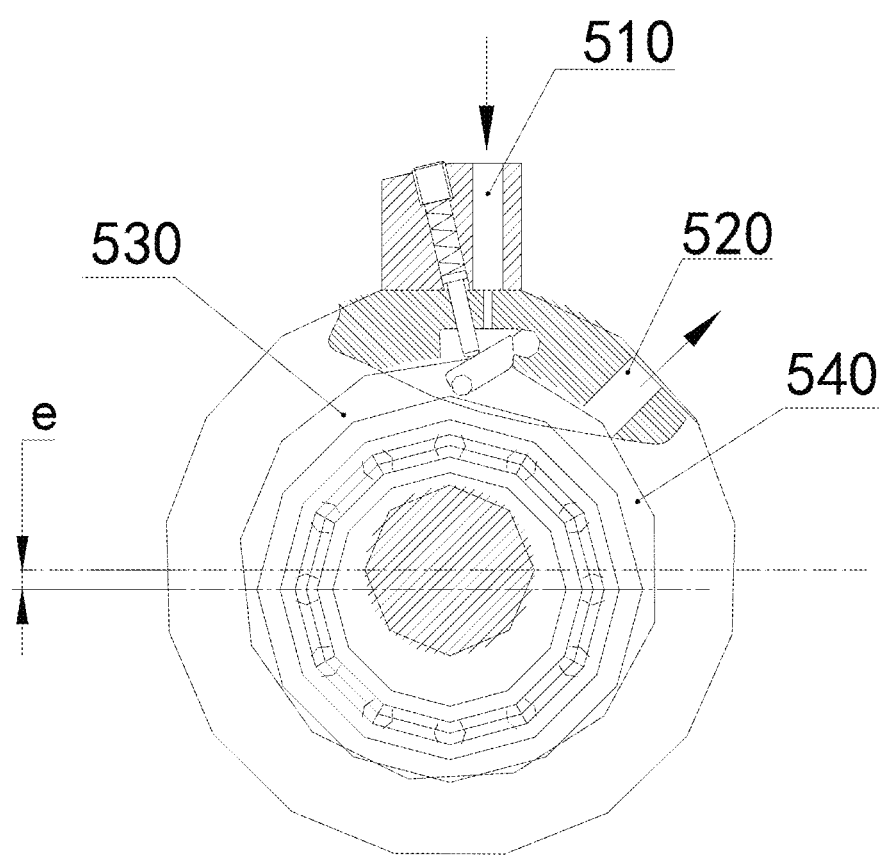
FIG. 13 is a section view of a fluid motor according to an embodiment of the present invention.

In addition, the present invention also provides a fluid motor. The fluid motor is similar in configuration to the above-mentioned rotor compressor except for design of an outlet and an inlet and a direction of corresponding fluid. FIG. 13 is a section view of a fluid motor according to an embodiment of the present invention. Referring to FIG. 13, the rotation device comprises: a second chamber, i.e., a work applying chamber 530, which is in communication with the high-pressure fluid inlet 510 through the second set of through hole; and a first chamber, i.e., a discharge chamber 540, which is in communication with a low-pressure fluid outlet 520 through the first set of through hole. High-pressure fluid drives the eccentric rotor to rotate, so that a generated torque is transmitted to an outside of the cylindrical inner chamber by means of the main shaft. In addition, it should be noted that the opening/closing valve shown in FIG. 2B is not provided between the high-pressure fluid inlet 510 and the second set of through holes so that the high-pressure fluid can flow in continuously. The high-pressure fluid may be liquid or gas.

An operation process of the fluid motor according to this embodiment will now be explained. High-pressure fluid flows in from the high-pressure fluid inlet 510, then enters the work applying chamber through the second set of through holes, and drives the eccentric rotor assembly 300 to rotate and revolve in a counterclockwise direction. The main shaft 200 is driven to rotate by the revolution of the eccentric rotor assembly 300. After the eccentric rotor assembly moves past its upmost point, it enters a next stroke. The fluid which has done work flows out to the low-pressure fluid outlet 520 through the first set of through holes.

So far the fluid motor according to this embodiment has been explained.

Those skilled in the art would clearly understand the rotation device according to the present invention by means of the above description of the rotor compressor and the fluid motor.

In conclusion, in the rotation device and the rotor compressor and the fluid motor to which the rotation device is applied, the rolling bearing is provided between the eccentric shaft and the rolling piston wheel, and reliable sealing of the cylinder block is achieved by the elastic preloading force; and the rotary valve body and the rotary valve body resetting mechanism are improved. As a result, a fluid machinery which has a high reliability and can have a large size is provided.

It should be noted that elements in the drawings are not necessarily plotted to strict scale for simply and concisely showing the elements. In addition, features and advantageous effects of the present invention are described in the embodiments. However, the structural and functional details of the present invention are described only for the purpose of disclosure and explanation of the present invention. It will be understood by those skilled in the art that various alterations in details especially in the shapes, dimensions, arrangement of the components of the present invention may be made in the embodiments without departing from the principles and spirit of the present invention, the scope of which is defined in the appended claims. In addition, the terms for indicating orientations, such as "upper", "lower", "front", "rear", "left", "right" and the like, mentioned in the embodiments are used for only referring to the orientations in the figures. Therefore, the terms for indicating orientations are used for explaining the present invention rather than limiting the present invention.

The objects, technical solutions, and advantageous effects of the present invention are further described in detailed in the above specific embodiments. It should be appreciated that the above description is only specific embodiments of the present invention and the embodiment is not used to limit the present invention. It will be understood by those skilled in the art that various modifications, equivalent substitutions and improvements may be made therein without departing from the principles and spirit of the present invention and fall within the scope of the present invention.

What is claimed is:

1. A rotation device, comprising:
   a cylinder block;
   a front end cover and a rear end cover which are tightly connected to a front end and a rear end of the cylinder block, respectively, and which define a cylindrical inner chamber together with the cylinder block;
   a main shaft which is rotatably supported by the cylinder block and/or the front and rear end covers, is partly located in the cylindrical inner chamber, and has a central axis coinciding with a central axis of the cylindrical inner chamber;
   an eccentric rotor assembly which is fitted over a portion of the main shaft located in the cylindrical inner chamber, and comprises:
      an eccentric shaft which is fitted over the portion of the main shaft located in the cylindrical inner chamber and has a central axis parallel to the central axis of the main shaft and offset from the central axis of the main shaft by a preset distance;
      a rolling piston wheel which is fitted over the eccentric shaft and has a central axis coinciding with the central axis of the eccentric shaft; and
      at least one rolling bearing which is symmetrically fitted over the eccentric shaft, and has an inner ring fixed to the eccentric shaft and an outer ring fixed to the rolling piston wheel to isolate rotation of the eccentric shaft from rotation of the rolling piston wheel, wherein the rolling piston wheel is pressed against an inner cylindrical surface of the cylindrical inner chamber by a preloading elastic force between the at least one rolling bearing and the rolling piston wheel, such that a sealed chamber extending in an axial direction is formed between the inner cylindrical surface of the cylindrical inner chamber and an outer cylindrical surface of the rolling piston wheel; and
      a partition mechanism partitioning the sealed chamber into a first chamber and a second chamber, the first chamber and the second chamber being independent of each other and being in communication with a first set of through hole and a second set of through hole disposed in the cylinder block, respectively;
      a first insertion groove distributed symmetrically with respect to a radial center line of grooves for rolling elements of the rolling bearing, formed on an inner cylindrical surface of the rolling piston wheel; and
      an elastic preloading element inserted in the first insertion groove and having a height in a state of receiving no force greater than a depth of the first insertion groove and generating the preloading elastic force;
   wherein the elastic preloading element comprises an annular, metal, spring plate sleeve, the spring plate sleeve including:
      an annular first perimeter edge;
      an annular second perimeter edge spaced apart from the first perimeter edge;
      a plurality of spaced apart elongated first slots, each first slot extending through the first perimeter edge and terminating at a first terminal location located toward the second perimeter edge;
      a plurality of spaced apart elongated second slots, each second slot extending through the second perimeter edge and terminating at a second terminal location located toward the first perimeter edge, each first slot being located between a separate pair of adjacent second slots,
   wherein the spring plate sleeve has a first width that extends between one of the first slots and an adjacently disposed one of the second slots and has a second width that extends between one of the first terminal locations and the second perimeter edge, the first width and the second width being substantially equal.

2. The rotation device of claim 1, wherein the eccentric shaft comprises:
   a plurality of eccentric shaft shoulders corresponding to one of the at least one rolling bearings, respectively, and disposed at a position of the eccentric shaft over which the at least one rolling bearing is fitted; and
   a counterbalance which is symmetrically disposed along the eccentric shaft between the two eccentric shaft shoulders to balance a counterweight of the eccentric shaft.

3. The rotation device of claim 2, wherein:
   the counterbalance comprises:
      a balance weight disposed on a lighter side of the eccentric shaft, to increase a counterweight on the lighter side; or
      a weight counterbalancing notch or hole which is formed on a heavier side of the eccentric shaft, to reduce a counterweight on the heavier side.

4. The rotation device of claim 1, wherein an accommodation groove extending in the axial direction and open towards the inner chamber is formed on the cylinder block; and the partition mechanism comprises:
   a rotary valve body which is mounted in the accommodation groove and is rotatably supported by the accommodation groove such that the rotary valve body swings in a predetermined angle range and which comprises:
      a connection part located at a root portion of the rotary valve body and hinged to the accommodation groove;
      a main body configured to swing within the predetermined angle range with the connection part serving as a shaft; and
      a rotary valve body resetting mechanism configured to press a distal end of the rotary valve body against the outer cylindrical surface of the rolling piston wheel all along such that the sealed chamber is partitioned into the first chamber and the second chamber which are independent of each other; wherein when the rotary valve body swings out from the accommodation groove, one of the first and second chambers that a front surface of the rotary valve body faces is the second chamber, while the other of the first and second chambers that a back surface of the rotary valve body faces is the first chamber.

5. The rotation device of claim 4, wherein the rotary valve body further comprises:
a swing seal slider which is hinged to the distal end of the rotary valve body, and has a surface coming into contact with the rolling piston wheel, the surface is a sealing arc surface which abuts against the rolling piston wheel and is slidable on the surface of the rolling piston wheel.

6. The rotation device of claim 5, wherein a hydrostatic bearing pressure chamber is formed on a bottom surface of the swing seal slider coming into contact with the rolling piston wheel.

7. The rotation device of claim 5, wherein the distal end of the main body of the rotary valve body has a sliding cylindrical hole; and
the swing seal slider comprises a head which has a cylindrical shape, and which is swingably positioned in the sliding cylindrical hole, located in the distal end of the main body of the rotary valve body, by being wrapped and constrained by the sliding cylindrical hole.

8. The rotation device of claim 4, wherein the rotary valve body resetting mechanism comprises:
a pin hole formed in a bottom of the accommodation groove at a position laterally opposite to the main body of the rotary valve body, and tightly isolated from an outside of the cylinder block; and
a resetting pin slidably inserted in the pin hole; and
an elastic part located inside the resetting pin in the pin hole, and having a distal end abutting against a tail of the resetting pin to generate an elastic force, wherein the elastic force causes a head of the resetting pin to push the main body of the rotary valve body in a direction towards the rolling piston wheel.

9. The rotation device of claim 8, wherein an included angle between a central axis of the pin hole and a perpendicular of the accommodation groove is between 5° and 30; and
a contact point between the resetting pin and the rotary valve body is at a distance of ⅕ to ½ of a length of the rotary valve body from the end of the rotary valve body pressed against the rolling piston wheel.

10. The rotation device of claim 8, wherein the pin hole is a blind hole, and the elastic part comprises:
a compression spring located in the pin hole, and having an end abutting against a bottom of the pin hole and another end abutting against the tail of the resetting pin; or
the elastic part comprises a nitrogen gas spring; and
the nitrogen gas spring is located in the pin hole, and has an end tightly isolating the cylindrical inner chamber from the outside of the cylinder block and another end abutting against the tail of the resetting pin.

11. The rotation device of claim 8, wherein the resetting pin is slidably tightly inserted in the pin hole; and
a space of the pin hole inside the resetting pin is in communication with the second chamber of the rotation device through a gas passage, and the elastic part comprises a compressed gas or a high-pressure fluid entering the pin hole.

12. The rotation device of claim 11, wherein a gas pressure adjusting device is disposed between the pin hole and the second chamber; or a compression spring is disposed in the space of the pin hole inside the resetting pin.

13. The rotation device of claim 1, wherein: the rolling bearing comprises a roller bearing, a ball bearing, a needle roller bearing, an aerodynamic rolling bearing or a composition bearing; and
the rolling bearing comprises one set of rolling bearings, two sets of rolling bearings, three sets of rolling bearings, or four sets of rolling bearings, wherein each set of rolling bearings comprise two rolling bearings disposed left-right symmetrically along the cylindrical inner chamber.

14. A rotor compressor, comprising:
the rotation device of claim 1, wherein:
the first chamber is in communication with a low-pressure compression medium input opening through the first set of through hole;
the second chamber is in communication with a discharge opening for a high-pressure compression medium that has been compressed, through the second set of through hole; and
a torque on an outside of the cylindrical inner chamber is transmitted to an inside of the cylindrical inner chamber by the main shaft, so that the compression medium is compressed by means of the eccentric rotor assembly.

15. A fluid motor, comprising:
the rotation device of claim 1, wherein:
the second chamber is in communication with a high-pressure fluid inlet through the second set of through hole;
the first chamber is in communication with a low-pressure fluid outlet through the first set of through hole; and
a high-pressure fluid drives the eccentric rotor to rotate, so that a generated torque is transmitted to an outside of the cylindrical inner chamber by means of the main shaft.

16. The rotation device of claim 1, wherein the spring plate sleeve has a third width that extends between one of the second terminal locations and the first perimeter edge, the first width and the third width being substantially equal.

17. The rotation device of claim 1, wherein the spring plate sleeve further comprises:
a plurality of spaced apart first base portions disposed along the first perimeter edge;
a plurality of spaced apart second base portions disposed along the second perimeter edge; and
a plurality of spaced apart, elongated, central portions that connect with one of the first base portions at a first end and connect with one of the second base portions at an opposing second end, each central portion having a smooth, continuous U-shaped arc that extends from the first end to the opposing second end,
wherein the first base portions and the second base portions outwardly project from the central portions at an orientation that is discontinuous with the smooth, continuous U-shaped arc of the central portions.

18. The rotation device of claim 17, wherein the first base portions outwardly project from the central portions so that a corner is formed at the connection between the first base portions and the central portions.

19. The rotation device of claim 17, further comprising:
the insertion groove having a rectangular transverse cross section that is bounded by a floor and opposing sidewalls upstanding from the floor; and
the spring plate sleeve being received within the insertion groove so that first base portions and the second base portions outwardly projecting from the central portions lay coplanar with the floor and butt against the opposing sidewalls, the central portions extending in the smooth, continuous U-shaped arc between the first base portions and the second base portions.

20. The rotation device of claim 1, wherein the outer ring of the rolling bearing has an outer surface and wherein a clearance between the outer surface of the rolling bearing and the inner cylindrical surface of the rolling piston wheel is between 0.1 and 1 mm so that the preloading elastic force generated by the elastic preloading element results in a radial contact between the outer cylindrical surface of the rolling piston wheel and the inner cylindrical surface of the cylindrical inner chamber of between 1 and 100 μm.

* * * * *